(12) United States Patent
Ohmori et al.

(10) Patent No.: US 8,900,760 B2
(45) Date of Patent: Dec. 2, 2014

(54) REACTOR AND PRODUCING METHOD OF THE SAME

(75) Inventors: Makoto Ohmori, Nagoya (JP);
Toshiyuki Nakamura, Nagoya (JP);
Masayuki Shinkai, Ama-Gun (JP);
Tsutomu Nanataki, Toyoake (JP)

(73) Assignee: NGK Insulators, Ltd., Nagoya (JP)

( * ) Notice: Subject to any disclaimer, the term of this patent is extended or adjusted under 35 U.S.C. 154(b) by 472 days.

(21) Appl. No.: 12/693,656

(22) Filed: Jan. 26, 2010

(65) Prior Publication Data

US 2010/0190066 A1 Jul. 29, 2010

(30) Foreign Application Priority Data

Jan. 28, 2009 (JP) ................................ 2009-017013
Oct. 19, 2009 (JP) ................................ 2009-240584

(51) Int. Cl.
*H01M 8/10* (2006.01)
*H01M 2/26* (2006.01)
*H01M 8/02* (2006.01)
*H01M 8/12* (2006.01)

(52) U.S. Cl.
CPC ............ *H01M 8/0297* (2013.01); *Y02E 60/525* (2013.01); *H01M 8/0232* (2013.01); *Y02E 60/50* (2013.01); *H01M 8/0247* (2013.01); *H01M 2008/1293* (2013.01)
USPC ........................................ 429/405; 429/507

(58) Field of Classification Search
None
See application file for complete search history.

(56) References Cited

U.S. PATENT DOCUMENTS

| 6,893,765 B1 | 5/2005 | Nishida et al. |
| 7,323,268 B2 | 1/2008 | Robert |
| 2005/0244700 A1 | 11/2005 | Abd Elhamid et al. |
| 2006/0134489 A1* | 6/2006 | Sarkar et al. .................... 429/31 |

FOREIGN PATENT DOCUMENTS

| EP | 1 458 042 A1 | 9/2004 |
| EP | 1 732 157 A1 | 12/2006 |
| JP | 2002-057154 A1 | 2/2002 |
| JP | 2004-342584 A1 | 12/2004 |
| JP | 2008-243394 A1 | 10/2008 |
| WO | 01/22513 A1 | 3/2001 |

* cited by examiner

*Primary Examiner* — Milton I Cano
*Assistant Examiner* — Sarah A Slifka
(74) *Attorney, Agent, or Firm* — Burr & Brown, PLLC

(57) ABSTRACT

The solid oxide fuel cell has a stack structure formed by stacking sheet bodies each of which comprises three layers of the electrolyte layer, a fuel electrode layer, an air electrode layer, and separators in alternating layers. In an air channel defined between the air electrode and the separator facing the air electrode layer, a SUS mesh made of stainless steel for electrically connecting both of them is confined. On the surface of the SUS mesh, previously by itself before the assembly of the stack structure, an Ag-plating treatment is performed and further a vacuum heat-treatment (heat-treatment under a negative pressure) is performed.

6 Claims, 28 Drawing Sheets

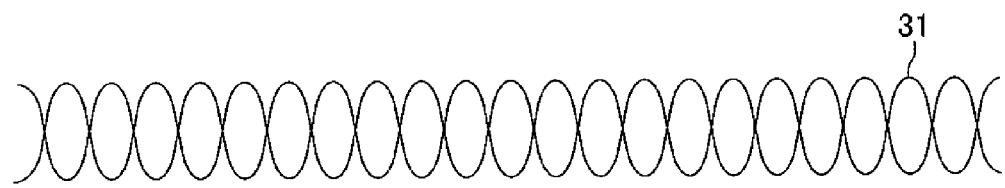
FIG.6A
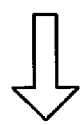
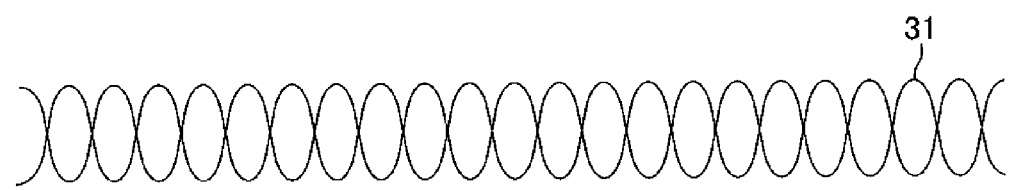
Ag – Plating Treatment
FIG.6B
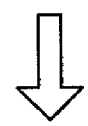
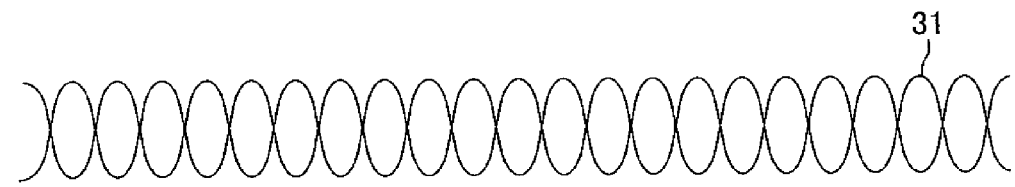
Vacuum Heat – treatment
FIG.6C

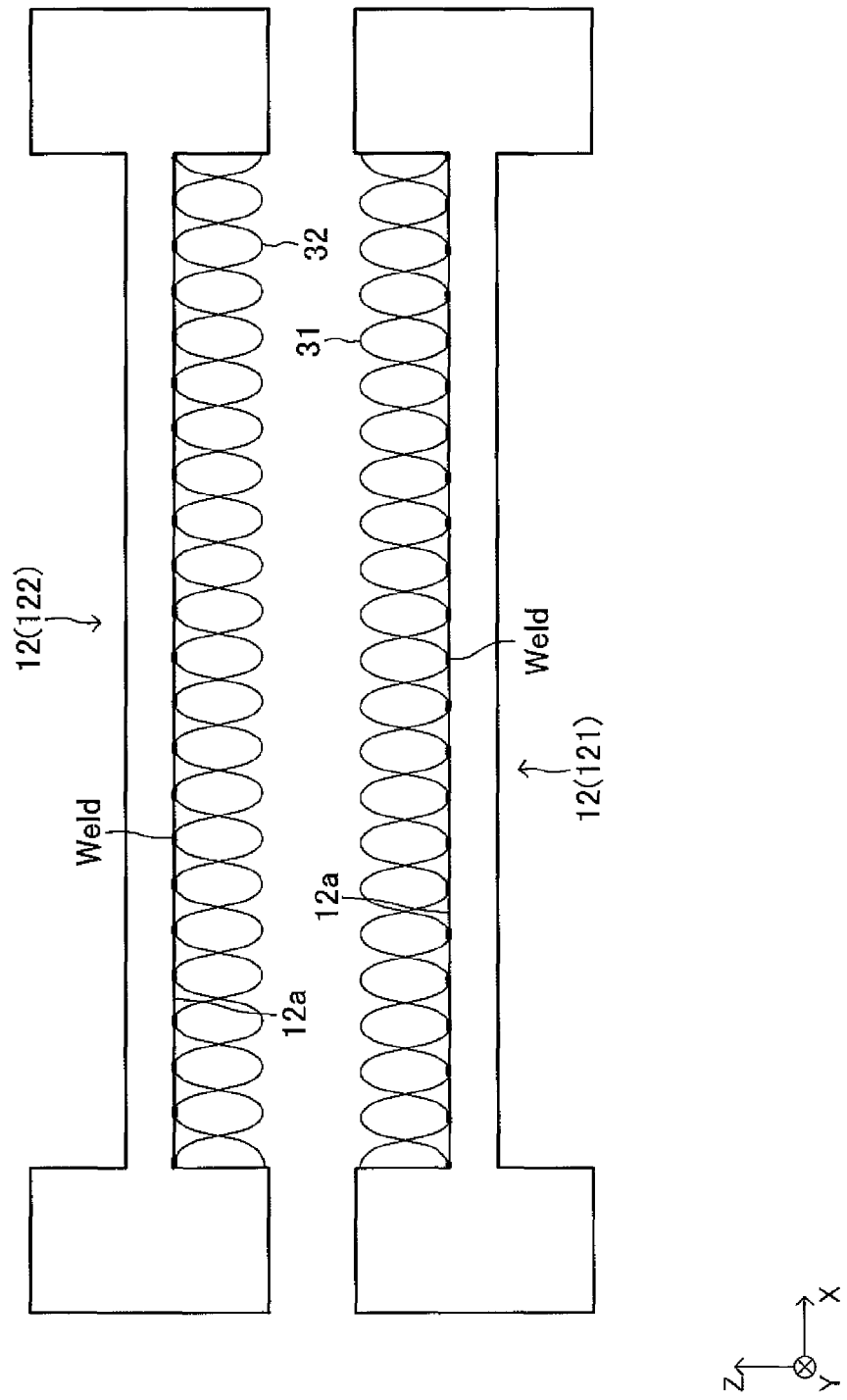

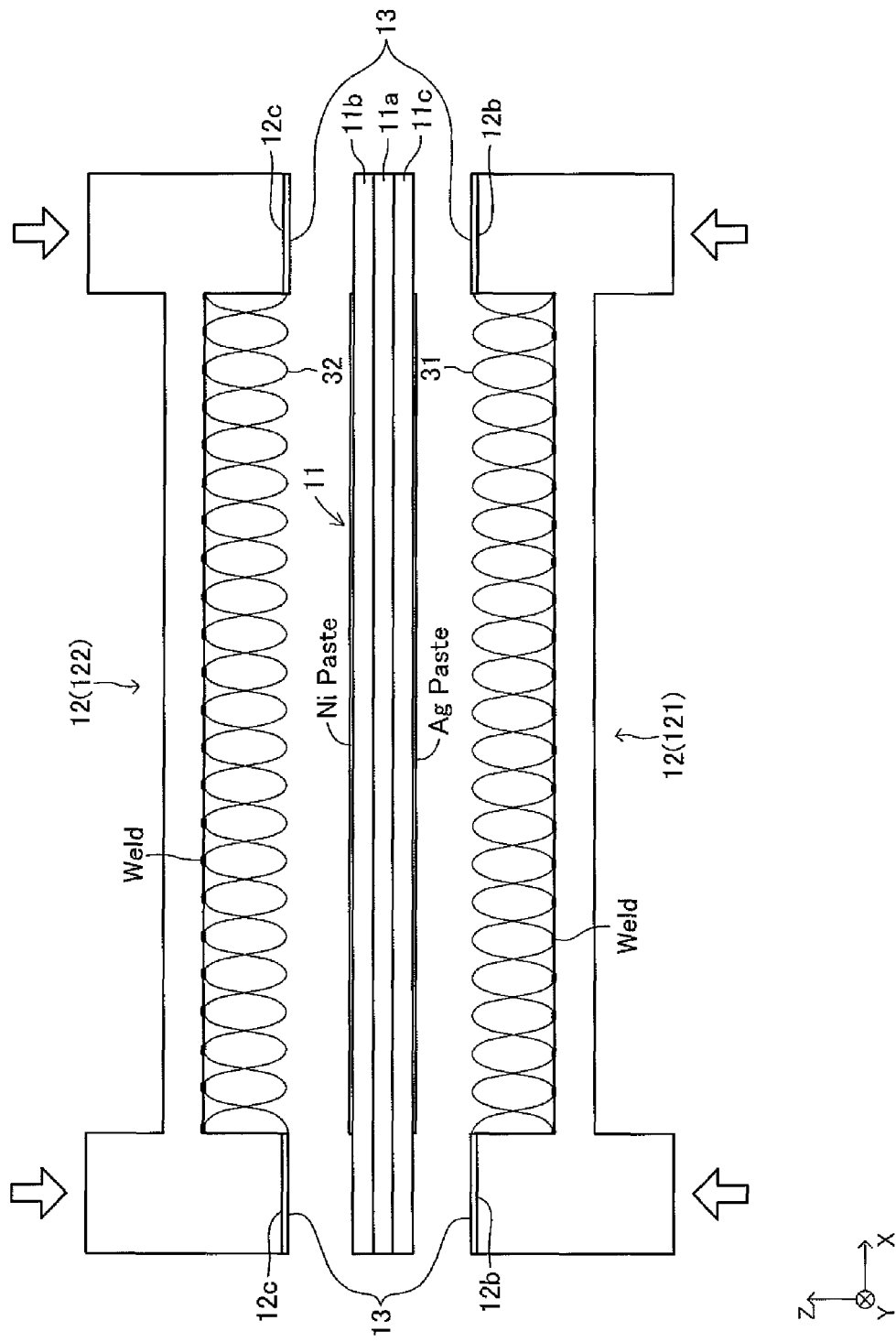

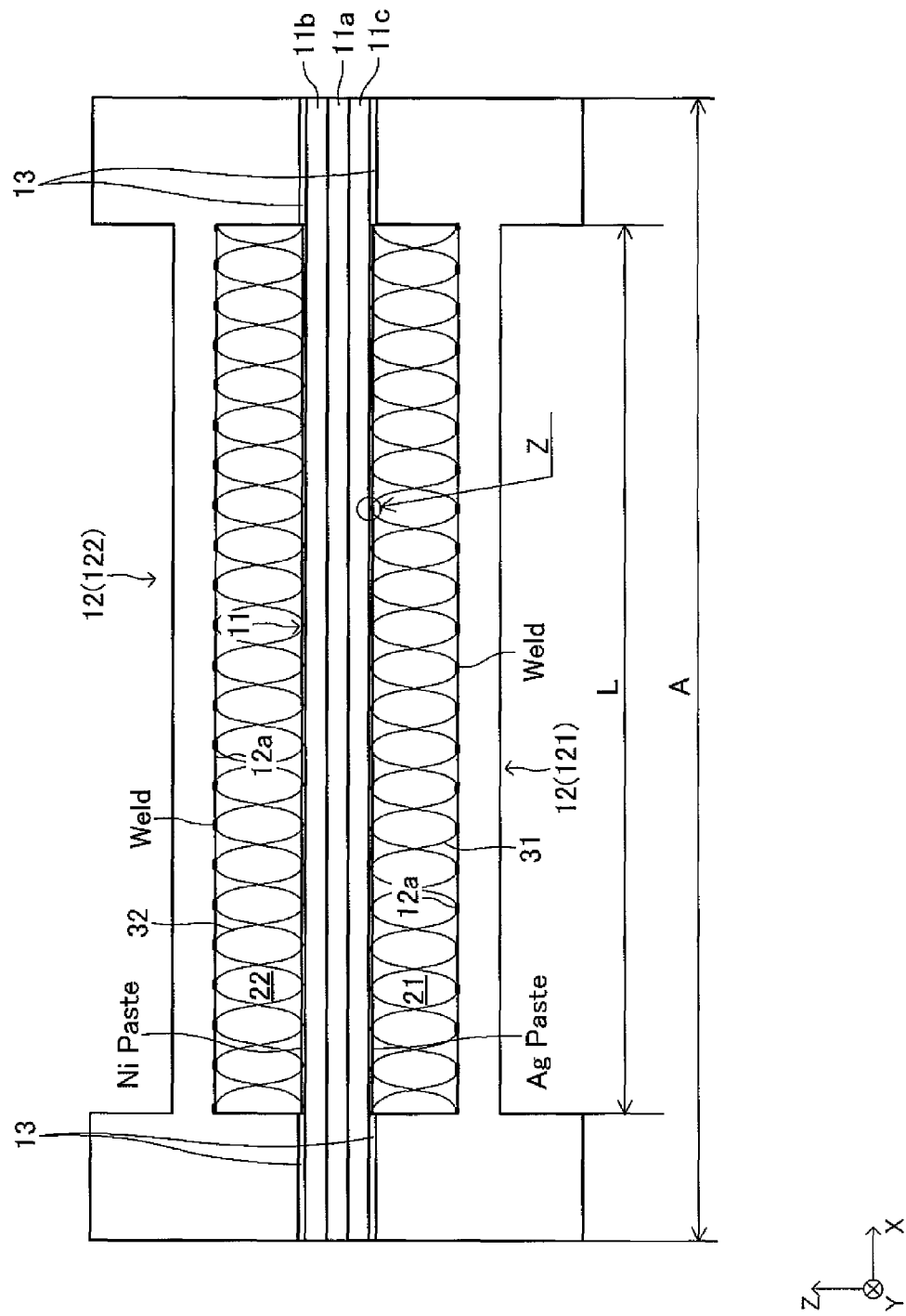

Comparative Example 2

Comparative Example 3

Present Embodiment

REACTOR AND PRODUCING METHOD OF THE SAME

BACKGROUND OF THE INVENTION

1. Technical Field

The present invention relates to a reactor utilizing a reaction member comprising an electrolyte portion containing solid electrolyte, a fuel electrode portion arranged integrally with the electrolyte portion and contacting a fuel gas to react the fuel gas, and an air electrode portion arranged integrally with the electrolyte portion and contacting an oxygen-containing gas to react the oxygen-containing gas.

2. Background Art

Conventionally, as a reactor utilizing the above-described reaction member, a solid oxide-type fuel cell (Solid Oxide Fuel Cell: SOFC), a fuel gas reforming apparatus, and the like are known. For example, the SOFC described in a Japanese Patent Application Laid-Open (kokai) No. 2004-342584 will be explained below.

In the SOFC described in the above Japanese Patent Application, as the reaction member, a sheet body formed by stacking and firing a solid electrolyte layer as the electrolyte portion, a fuel electrode layer as the fuel electrode portion formed on the upper surface of the solid electrolyte layer, and an air electrode layer as the air electrode portion formed on the lower surface of the solid electrolyte layer is used. In this SOFC, a flat-plate stack structure, in which sheet bodies and metallic separators supporting the sheet bodies are stacked in alternating layers, is adopted.

For each sheet body, a fuel channel, through which a fuel gas (e.g., hydrogen gas) flows, is formed and defined in a space between the separator adjacent to the upper side of the sheet body (upper separator) and (the fuel electrode layer in) the sheet body, and an air channel, through which an oxygen-containing gas (e.g., air) flows, is formed and defined in a space between the separator adjacent to the lower side of the sheet body (lower separator) and (the air electrode layer in) the sheet body.

In the SOFC described in the above document, for each of the sheet bodies, an electrically conductive member (specifically, metal mesh or the like) for electrically connecting the upper separator and the fuel electrode layer of the sheet body is often confined in the fuel channel. It can be said that the electrically conductive member on the side of the fuel channel is a member which is electrically connected with the fuel electrode layer (fuel electrode portion) to give and receive electrical power to and from the fuel electrode layer (fuel electrode portion). As a material for the electrically conductive member on the side of the fuel channel, nickel or the like is generally used.

Similarly, for each of the sheet bodies, an electrically conductive member (specifically, metal mesh or the like) for electrically connecting the lower separator and the air electrode layer of the sheet body is often confined in the air channel. It can be said that the electrically conductive member on the side of the air channel is a member which is electrically connected with the air electrode layer (air electrode portion) to give and receive electrical power to and from the air electrode layer (air electrode portion). As a material for the electrically conductive member on the side of the air channel, metal containing iron, chromium as a main component, e.g., stainless steel (specifically, ferritic SUS or the like) is generally used.

Thus, when the electrically conductive members are respectively confined in the fuel channel and the air channel, the SOFC described in the above document is assembled and manufactures, for example, as follows. First, in a state in which an adhesive interposes at the bonded surfaces between the sheet body and the separator adjacent to each other, the sheet bodies and the separators are stacked in alternating layers with the electrically conductive members interposed on the side of the fuel channel and on the side of the air channel respectively. During the stacking process, in order to secure the reliability of the electrical connection between the upper separator and the electrically conductive member on the side of the fuel channel, as well as the reliability of the electrical connection between the lower separator and the electrically conductive member on the side of the air channel, by means of welding, diffusion bonding or the like, the electrical connection portion between the upper separator and the electrically conductive member on the side of the fuel channel may be previously fixed in an electrically connected state, as well as the electrical connection portion between the lower separator and the electrically conductive member on the side of the air channel may be previously fixed in an electrically connected state.

In addition, during the stacking process, in order to secure the reliability of the electrical connection between the fuel electrode layer of the sheet body and the electrically conductive member on the side of the fuel channel, electrically conductive adhesive paste (e.g., nickel paste, or nickel oxide paste) may be previously coated on the surface of the fuel electrode layer of the sheet body. Similarly, in order to secure the reliability of the electrical connection between the air electrode layer of the sheet body and the electrically conductive member on the side of the air channel, electrically conductive adhesive paste (e.g., silver paste, electrically conductive ceramic paste, or platinum paste) may be previously coated on the surface of the air electrode layer of the sheet body.

After the assembly of the stack structure as described above, in order to solidify the above-described adhesive, and in order to solidify (fire) the above-described adhesive paste when the adhesive paste is coated, a heat-treatment is performed on the stack structure. Thereby, an SOFC having a stack structure is completed.

The above-described electrically conductive member (metal mesh or the like) made of stainless steel on the side of the air channel will be discussed below. The electrically conductive member made of stainless steel is likely to have chromia ($Cr_2O_3$) formed on the surface thereof at a high temperature of about 400° C. or higher and in the air. Accordingly, when a heat-treatment at 400° C. or higher is performed during the manufacturing (assembling) process of the stack structure as described above, it is likely that chromia is formed in the surface of the electrically conductive member. In addition, since the working temperature of SOFC is generally 400° C. or higher, chromia may be formed on the surface of the electrically conductive member during the operation of SOFC as well.

The chromia may be formed at the boundary between the electrically conductive member and the air electrode layer of the sheet body (i.e., on the surface of the electrical connection portion), when the electrically conductive member and the air electrode layer of the sheet body directly contact each other. Further, as described above, the chromia may be formed at the boundary between the electrically conductive member and the adhesive paste (i.e., on the surface of the electrical connection portion), when the adhesive paste interposes between the electrically conductive member and the air electrode layer of the sheet body. This is because air (oxygen) can be supplied to the boundary between the electrically conductive member and the adhesive paste through a large number of pores existing in the adhesive paste.

Chromia has a large electrical resistance. Therefore, when chromia is formed at the boundary between the electrically conductive member and the air electrode layer of the sheet body (or at the boundary between the electrically conductive member and the adhesive paste) (i.e., on the surface of the electrical connection portion) as described above, problems such as the increase in the electrical resistance (internal resistance) of the SOFC as a whole and the decrease in the output of the SOFC as a whole may occur.

SUMMARY OF THE INVENTION

Accordingly, an object of the present invention is to suppress the formation of chromia on the surface of an electrical connection portion between an air electrode portion and an electrically conductive member made of stainless steel for giving and receiving electrical power to and from the air electrode layer during the manufacturing process of a reactor utilizing a reaction member comprising an electrolyte portion, a fuel electrode portion, and an air electrode portion.

The reactor according to the present invention comprises a reaction member (comprising an electrolyte portion containing solid electrolyte, a fuel electrode portion arranged integrally with the electrolyte portion and contacting a fuel gas to react the fuel gas, and an air electrode portion arranged integrally with the electrolyte portion and contacting an oxygen-containing gas to react the oxygen-containing gas) and, other than the reaction member, an electrically conductive member made of metal containing iron and chromium which is electrically connected with the air electrode portion to give and receive electrical power to and from the air electrode portion. The electrically conductive member is preferably made of stainless steel.

In the case where the reactor functions as an SOFC, oxygen ions can be conducted within the electrolyte portion. The air electrode portion facilitates a reaction creating oxygen ions from an oxygen-containing gas (e.g., air) on its surface and oxygen ions can be conducted within the air electrode portion. The fuel electrode portion facilitates a reaction creating electrons by reacting oxygen ions with a fuel gas.

In an aspect of the reactor according to the present invention, a metal film is formed on the surface of at least the portion on the electrically conductive member, which is electrically connected with the air electrode portion, and a first heat-treatment is performed on the electrically conductive member after the formation of the metal film, in a state in which an ambient pressure is adjusted to a negative pressure lower than an atmospheric pressure, and the electrically conductive member and the air electrode portion are electrically connected by electrically connecting the air electrode portion and a post-heat-treatment metal film surface, which is the surface of the portion on which the metal film is formed and then the first heat-treatment is performed.

The producing method of the reactor includes:
a metal film forming step wherein metal film is formed on the surface of at least the portion on the electrically conductive member, which is electrically connected with the air electrode portion,
a first heat-treatment step wherein the first heat-treatment is performed on the electrically conductive member after the metal film forming step, in a state in which an ambient pressure is adjusted to a negative pressure lower than an atmospheric pressure; and an electrically connecting step wherein the electrically conductive member and the air electrode portion are electrically connected by electrically connecting the air electrode portion and a post-heat-treatment metal film surface, which is the surface of the portion with the metal film formed thereon, after the first heat-treatment step.

Herein, the metal film is preferably formed by metalizing plating. In this case, during the metal film forming step, the metal film is formed by metalizing plating.

In order to suppress the oxidization of the surface, i.e., the formation of chromia on the surface, while maintaining the electrical conductivity of the electrically conductive member made of iron-series metal containing chromium (e.g., stainless steel), it is supposed to form an electrically conductive oxygen barrier layer (metal film) for suppressing the oxygen supply to the surface of the electrically conductive member. As the oxygen barrier layer (metal film), a dense (with low porosity) metal-plated layer is preferably formed. However, the inventors found out that, even if metal film such as a metal-plated layer has been formed, during the subsequent manufacturing process of the reactor, or during the operation of the reactor, when the electrically conductive member (after the formation of metal film) is placed at a high temperature, chromia may be still formed on the surface of the electrically conductive member (i.e., at the boundary between the electrically conductive member and the metal film) (will be described later in detail). It is believed that this is because part of the metal film is detached from the surface of the electrically conductive member due to not only the lack of adhesion strength of the metal film, but also the difference of the coefficients of thermal expansion between the electrically conductive member and the metal film, and, through the detached region, oxygen can be supplied to the surface of the electrically conductive member.

Therefore, as a result of further investigation, the inventors found out that when the heat-treatment is performed on the electrically conductive member after the formation of metal film, in a state in which an ambient pressure is adjusted to a negative pressure lower than an atmospheric pressure (a negative pressure condition), it is difficult for chromia to be formed on the surface of the electrically conductive member (i.e., at the boundary between the electrically conductive member and the metal film), even though the electrically conductive member (after the formation of the metal film and the heat-treatment) is placed at a high temperature, during the subsequent manufacturing process of the reactor, or during the operation of the reactor (will be described in detail). It is believed that this is because, in a negative pressure condition where the concentration of oxygen is low in the atmosphere (i.e., a state wherein even if the metal film detached, it is difficult to provide the surface of the electrically conductive member with oxygen), the boundary between the electrically conductive member and the metal film is reacted and integrated by the heat-treatment, and thereby a strong oxygen barrier layer is formed on the surface of the electrically conductive member.

The above-described configuration is based on such knowledge. According thereto, by electrically connecting the surface of the portion on which the metal film is formed and then the first heat-treatment is performed (post-heat-treatment metal film surface) with the air electrode portion, the formation of chromia on the surface of the electrical connection portion with the air electrode portion on the electrically conductive member (at the boundary between the electrically conductive member and the metal film) can be suppressed, even though the electrically conductive member is placed at a high temperature, during the subsequent manufacturing process of the reactor, or during the operation of the reactor. As a result, the increase in the electrical resistance (internal resistance) of the reactor as a whole due to the oxidization of the surface of the electrical connection portion with the air electrode portion on the electrically conductive member can be suppressed. Accordingly, for example, when the reactor is an SFOC, the decrease in the output of the SOFC as a whole can be suppressed.

Further, in accordance with the above-described configuration, even when the working temperature is high, 500 to 1000° C., as in the case of SOFC, the presence of the above-described strong barrier lay makes it difficult for chromia to be formed on the surface of the electrically conductive member during the operation of the reactor. Accordingly, even though the reactor has been operated for a long period, the increase of in the electrical resistance of the reactor as a whole can be suppressed.

In order to suppress the increase in the electrical resistance at the electrical connection portion between the electrically conductive member and the air electrode portion, it is enough to form the metal film (and perform the heat-treatment) only on the surface of the electrical connection portion with the air electrode portion on the electrically conductive member. However, the metal film may be formed (and the heat-treatment may be performed) on the whole surface of the electrically conductive member. When a metalizing plating is performed in order to form the metal film, for example, a silver-plating, a zinc-plating may be used as metalizing plating. After taking into account the fact that noble metal unlikely to be oxidized, as the metalizing plating, it is preferred to use a silver-plating. Thereby, the increase of the electrical resistance of the reactor as a whole due to the oxidization of the surface of the metal-plated portion (especially, the surface of the electrical connection portion with the air electrode portion) can be suppressed.

In addition, chromium poisoning of the air electrode portion from the electrical conductivity of the electrically conductive member made of iron-series metal containing chromium (e.g., stainless steel) can be suppressed. The term "chromium poisoning of the air electrode portion" means that chromium is flown apart therefrom and attaches to the air electrode portion by subjecting the iron-series metal containing chromium (e.g., stainless steel) to a high temperature. The chromium poisoning may deactivate the air electrode portion and, as a result, lower the output of the reactor.

In the reactor according to the above-described present invention, it is preferred that, in a state in which the post-heat-treatment metal film surface and the air electrode portion are connected through an electrically conductive adhesive paste, a second heat-treatment is performed to solidify (fire) the adhesive paste and thereby the post-heat-treatment metal film surface and the air electrode portion are electrically connected. In this case, the electrically connecting step includes the second heat-treatment step wherein, in a state in which the post-heat-treatment metal film surface and the air electrode portion are connected through an adhesive paste, the second heat-treatment is performed to solidify (fire) the adhesive paste and thereby the post-heat-treatment metal film surface and the air electrode portion are electrically connected.

Herein, as the adhesive paste, silver paste, electrically conductive ceramic paste, platinum paste or the like may be used. Among them, silver paste is preferably used, since it is low in cost, unlikely to be oxidized, and low in electrical resistance. The adhesive paste may be previously coated on the surface of the electrical connection portion with the "post-heat-treatment metal film" on the air electrode portion, or may be previously coated on the surface of the electrical connection portion with the air electrode portion on the "post-heat-treatment metal film."

As described above, by electrically connecting the "post-heat-treatment metal film" and the air electrode portion through the adhesive paste, the reliability of the electrical connection between the air electrode portion and the electrically conductive member can be secured.

In accordance with the investigation by the inventors, it was revealed that, in the heat-treatment (first heat-treatment) performed on the electrically conductive member after the formation of the above-described metal film (e.g., after a metalizing plating), the negative pressure (degree of vacuum) is preferably adjusted to be from $10^{-5}$ Pa to $10^{-1}$ Pa. Further, it was revealed that the temperature is preferably adjusted to be from 500° C. to 900° C. Furthermore, the duration time of the heat-treatment (first heat-treatment) is preferably from 10 minutes to 3 hours. They will be described hereinafter.

In the above-described reactor according to the present invention, the air electrode portion and the electrically conductive member are electrically connected through the metal film. For example, the electrically conductive member is made of stainless steel, and the metal film is made of Ag. Observation of the boundary between the electrically conductive member and the metal film revealed that although a "layer containing chromia ($Cr_2O_3$)" is formed at the boundary, the thickness of the "layer containing chromia ($Cr_2O_3$)" is extremely thin, 0.8 μm or less, immediately after the completion of the assembly of the reactor, or under a condition where the total operation period of the reactor is 100 hours or less. Such an extremely thin thickness of the "layer containing chromia ($Cr_2O_3$)" can suppress the increase of the electrical resistance (internal resistance) of the electrical connection portion between the electrically conductive member and the air electrode portion.

In the case where the reactor is an SOFC having a flat-plate stack structure, the reaction member is a sheet body formed by stacking and firing a solid electrolyte layer as the electrolyte portion, a fuel electrode layer as the fuel electrode portion formed on the upper surface of the solid electrolyte layer, and an air electrode layer as the air electrode portion formed on the lower surface of the solid electrolyte layer is used. In this SOFC, the sheet bodies and metallic separators supporting the sheet bodies are stacked in alternating layers. For each of the sheet bodies, a fuel channel, through which the fuel gas flows, is formed and defined in a space between the separator adjacent to the upper side of the sheet body (upper separator) and the sheet body, and an air channel, through which the oxygen-containing gas flows, is formed and defined in a space between the separator adjacent to the lower side of the sheet body (lower separator) and the sheet body. Further, for each of the sheet bodies, the electrically conductive member is confined in the air channel such that the electrically conductive member is electrically connected with both the lower separator and the air electrode layer of the sheet body. For each of the electrically conductive members, the metal film is formed on the surface of at least the portion on the electrically conductive member, which is electrically connected with the air electrode layer, and the first heat-treatment is performed on the electrically conductive member after the formation of the metal film, and the electrically conductive member and the air electrode layer are electrically connected by electrically connecting the air electrode layer and the post-heat-treatment metal film surface.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 6 is a schematic view, showing a treatment of the metal mesh shown in FIG. 4;

FIG. 7 is a schematic view, showing metal mesh being welded on separators;

FIG. 9 is a schematic view, showing a thin sheet body and separators with the peripheral regions coated with seal material being stacked in alternating layers;

FIG. 10 is a schematic view corresponding to FIG. 4, showing a thin sheet body and separators stacked in alternating layers;

DETAILED DESCRIPTION OF THE INVENTION

A reactor (solid oxide fuel cell) according to an embodiment of the present invention will next be described with reference to the drawings.

Figure 1:
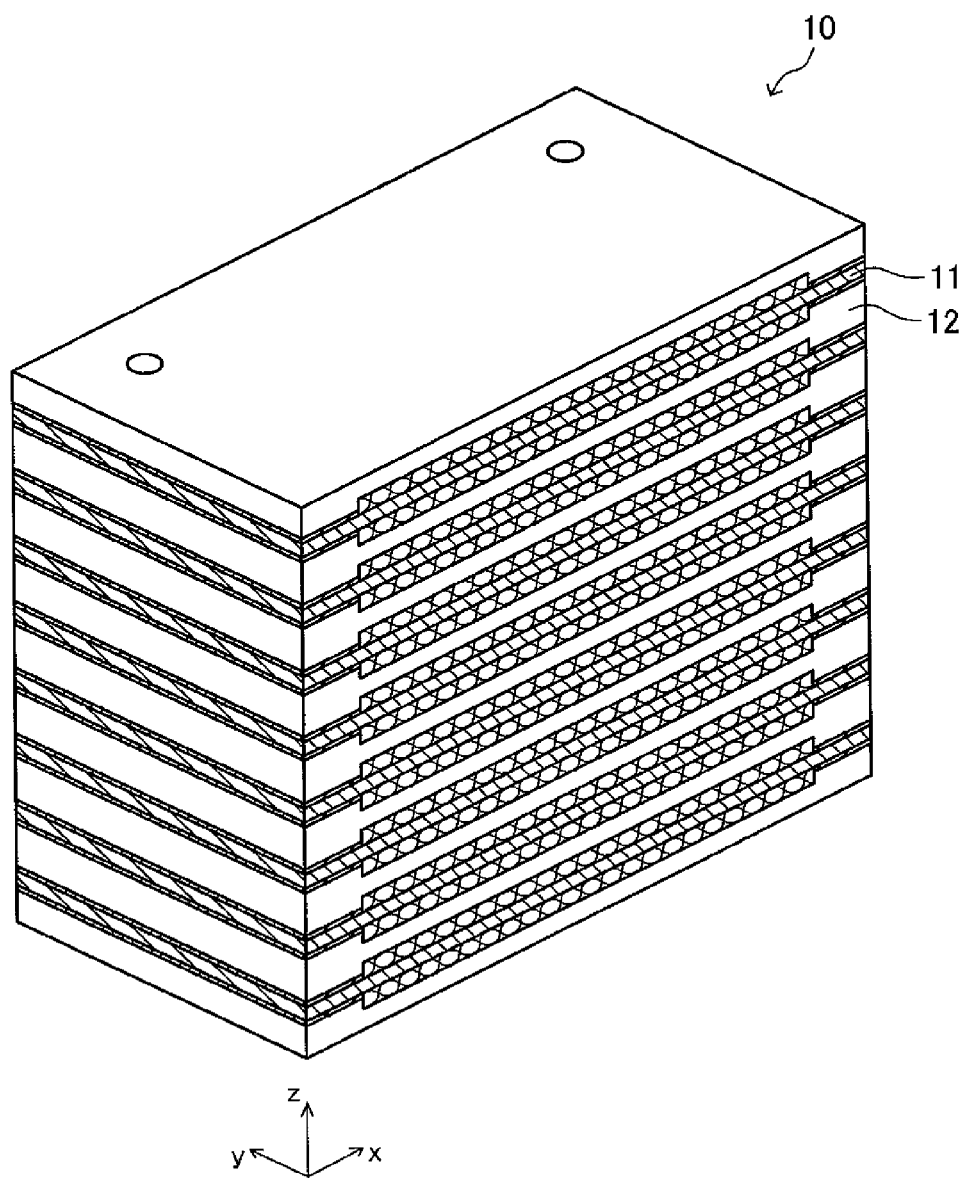
FIG. 1 is a cutaway perspective view of a solid oxide fuel cell according to an embodiment of the present invention.
Figure 2:
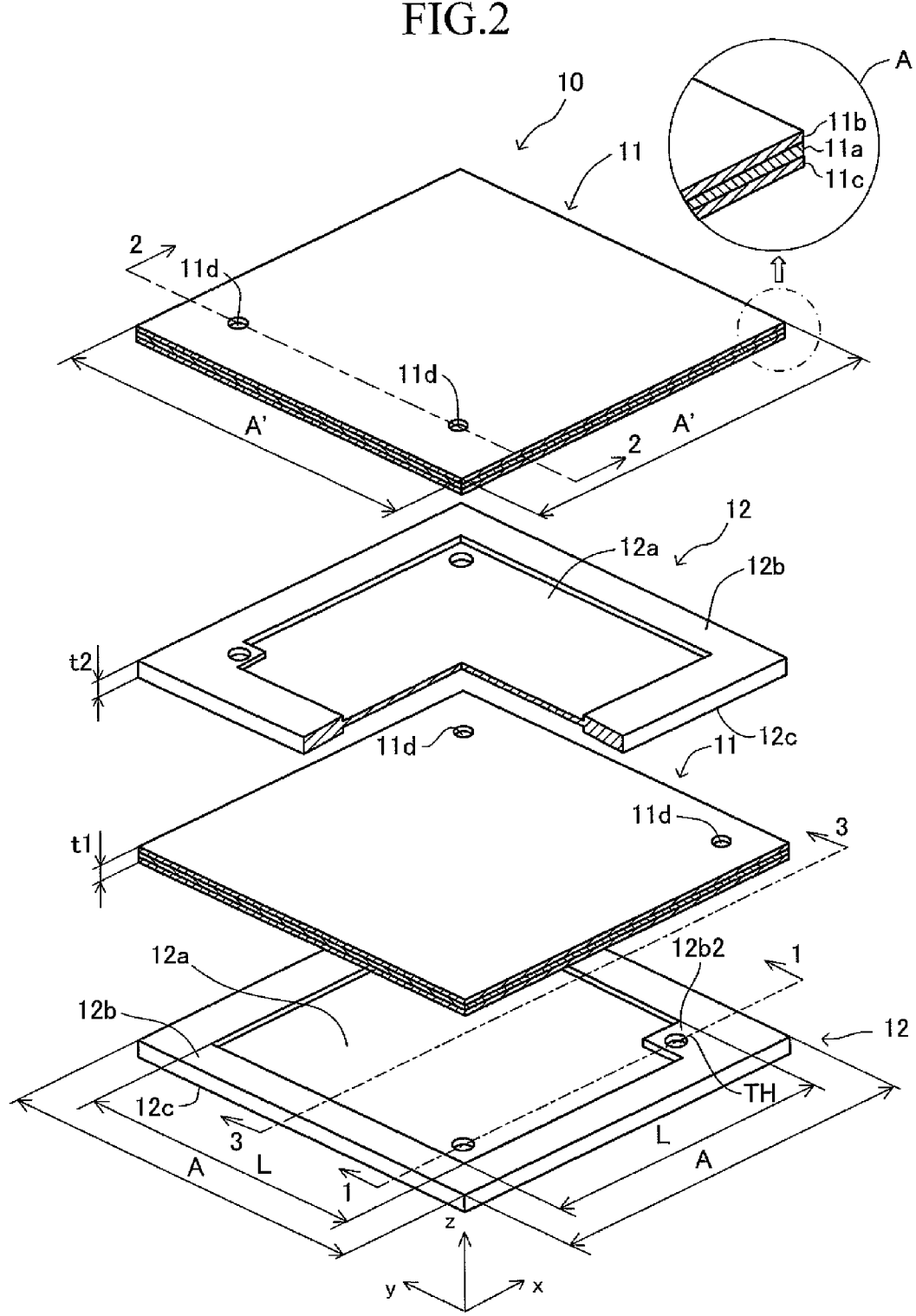
FIG. 2 is an exploded partial perspective view of the fuel cell shown in FIG. 1.

Overall Structure of Fuel Cell:

FIG. 1 perspectively shows, in a cutaway fashion, a solid oxide fuel cell (hereinafter, referred to merely as the "fuel cell") 10 according to an embodiment of the present invention. FIG. 2 perspectively and partially shows, in an exploded fashion, the fuel cell 10. The fuel cell 10 is configured such that sheet bodies 11 and separators 12 are stacked in alternating layers. That is, the fuel cell 10 has a flat-plate stack structure. The sheet body 11 is also referred to as a "single cell" of the fuel cell 10.

As shown on an enlarged scale within a circle A of FIG. 2, the sheet body 11 is a fired body having an electrolyte layer (solid electrolyte layer) 11*a*, a fuel electrode layer 11*b* formed on the electrolyte layer 11*a* (on the upper surface of the electrolyte layer 11*a*), and an air electrode layer 11*c* formed beneath a side of the electrolyte layer 11*a* (on the lower surface of the electrolyte layer 11*a*, on the opposite surface from the fuel electrode layer 11*b*). The planar shape of the sheet body 11 is a square having sides (length of one side=A) extending along mutually orthogonal x- and y-axes. The sheet body 11 is a plate member (thickness=t1) having a thickness along a z-axis orthogonal to the x-axis and the y-axis.

In the present embodiment, the electrolyte layer 11*a* is a dense fired body of YSZ (yttria-stabilized zirconia). The fuel electrode layer 11*b* is a fired body of Ni—YSZ (the fired body is a state after the later-described reduction process. It is a fired body of NiO—YSZ before the reduction process), and a porous electrode layer. The air electrode layer 11*c* is a fired body of USCF (lanthanum strontium cobalt ferrite) and a porous electrode layer. The electrolyte layer 11*a*, the fuel electrode layer 11*b*, and the air electrode layer 11*c* have different room-temperature-to-1000° C. mean thermal expansion coefficients of about 10.8 ppm/K, 12.5 ppm/K, and 12 ppm/K, respectively. In addition, a reaction preventing layer, for example GDC (gadolinium doped ceria), may be interposed between the air electrode layer 11c and the electrolyte layer 11a.

The sheet body 11 has a pair of cell through-holes 11d. Each of the cell through-holes 11d extends through the electrolyte layer 11a, the fuel electrode layer 11b, and the air electrode layer 11c. The paired cell through-holes 11d are formed in the vicinity of one side of the sheet body 11 and in the vicinity of corresponding opposite ends of the side.

Figure 3:
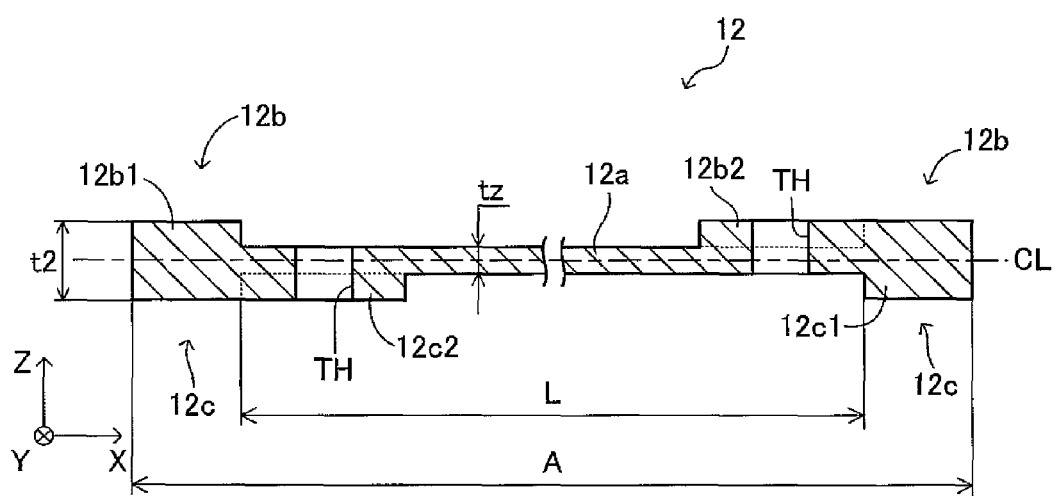
FIG. 3 is a sectional view of a separator taken along a plane that includes line 1-1 of FIG. 2 and is in parallel with an x-z plane.

FIG. 3 is a sectional view of the separator 12 taken along a plane that includes line 1-1 of FIG. 2 parallel with the x-axis and is in parallel with the x-z plane. As shown in FIGS. 2 and 3, the separator 12 includes a plane portion 12a, an upper frame portion 12b (perimetric portion), and a lower frame portion 12c (perimetric portion). The planar shape of the separator 12 is a square having sides (length of one side=A) extending along the mutually orthogonal x- and y-axes. The thickness of the plane portion 12a is tz, and the thickness of the "frame portion" (perimetric portion) is t2 (>tz).

The separator 12 is formed from a Ni-based heat-resistant alloy (e.g., ferritic SUS, INCONEL 600, HASTELLOY or the like). The separator 12 formed from, for example, SUS 430, which is a ferritic SUS, has a room-temperature-to-1000° C. mean thermal expansion coefficient of about 12.5 ppm/K. Thus, the thermal expansion coefficient of the separator 12 is higher than the mean thermal expansion coefficient of the sheet body 11. Therefore, when the temperature of the fuel cell 10 changes, the difference in the amount of expansion and contraction is produced between the sheet body 11 and the separator 12.

The plane portion 12a is a thin, flat body having a thickness along the z-axis. The planar shape of the plane portion 12a is a square having sides (length of one side=L(<A)) extending along the x-axis and the y-axis.

The upper frame portion 12b is a frame body provided around the plane portion 12a (in a region in the vicinity of the four sides of the plane portion 12a; i.e., an outer peripheral region of the plane portion 12a) in an upwardly projecting condition. The upper frame portion 12b consists of a perimetric frame portion 12b1 and a jutting portion 12b2.

The perimetric frame portion 12b1 is located on a side toward the perimeter of the separator 12. The vertical section of the perimetric frame portion 12b1 (e.g., a section of the perimetric frame portion 12b1 whose longitudinal direction coincides with the direction of the y-axis, taken along a plane parallel with the x-z plane) assumes a rectangular shape (or a square shape).

The jutting portion 12b2 juts toward the center of the separator 12 from the inner peripheral surface of the perimetric frame portion 12b1 at one of four corner portions of the plane portion 12a. The lower surface of the jutting portion 12b2 is integral with the plane portion 12a. The shape of the jutting portion 12b2 as viewed in plane is generally square. The upper surface (plane surface) of the jutting portion 12b2 is continuous with the upper surface (plane surface) of the perimetric portion 12b1. The jutting portion 12b2 has a through-hole TH formed therein. The through-hole TH also extends through a portion of the plane portion 12a that is located under the jutting portion 12b2.

The lower frame portion 12c is a frame body provided around the plane portion 12a (in a region in the vicinity of the four sides of the plane portion 12a; i.e., an outer peripheral region of the plane portion 12a) in a downwardly projecting condition. The lower frame portion 12c is symmetrical with the upper frame portion 12b with respect to a centerline CL that halves the thickness of the plane portion 12a. Accordingly, the lower frame portion 12c has a perimetric frame portion 12c1 and a jutting portion 12c2 that are identical in shape with the perimetric frame portion 12b1 and the jutting portion 12b2, respectively. However, the jutting portion 12c2 is formed at the plane portion 12a in such a manner as to be diagonally opposite the jutting portion 12b2 as viewed in plane.

Figure 4:
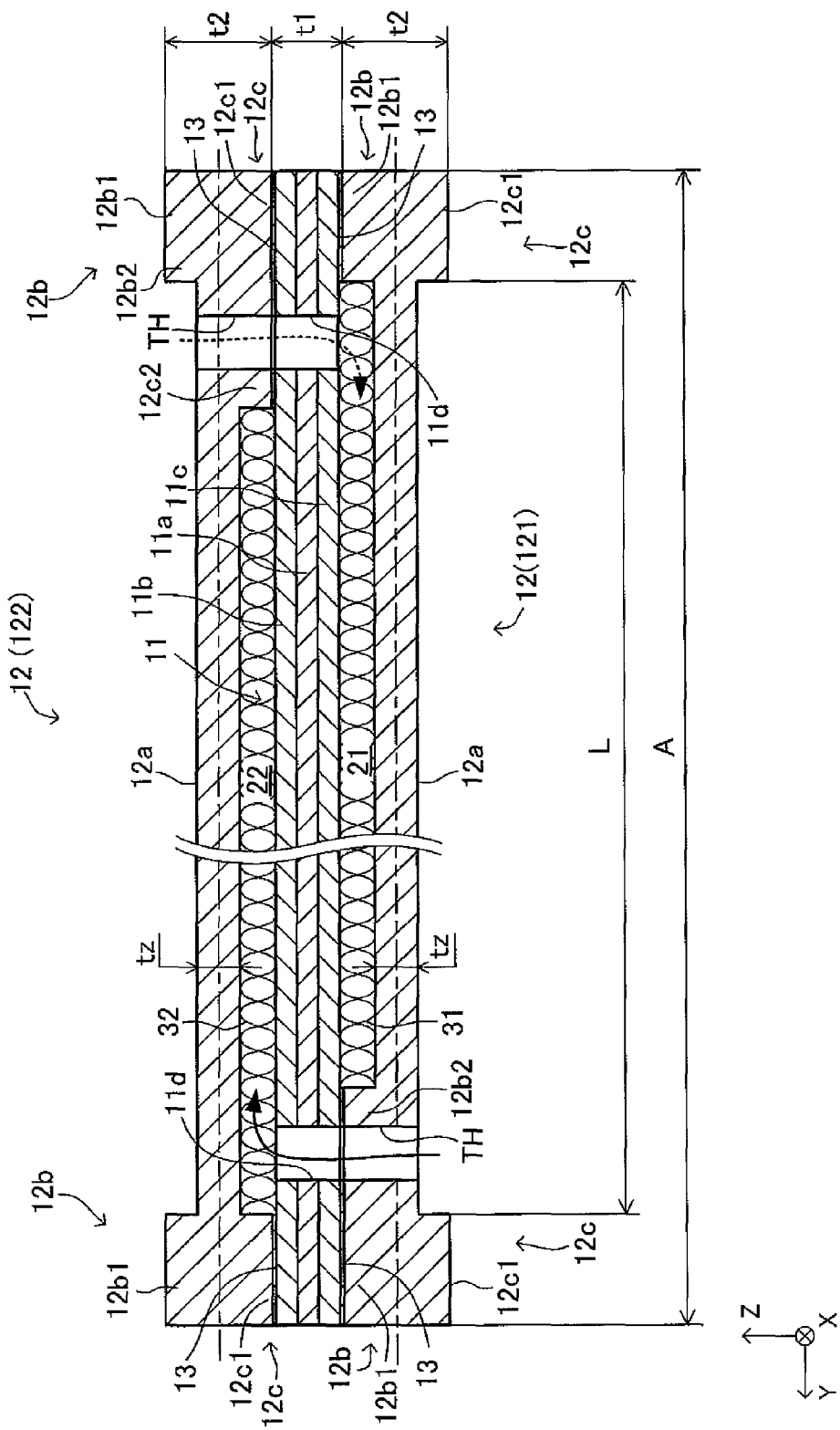
FIG. 4 is a vertical sectional view of the sheet body and the separator, which holds the sheet body, shown in FIG. 1, taken along a plane that includes line 2-2 of FIG. 2 and is in parallel with a y-z plane.

FIG. 4 is a vertical sectional view of the sheet body 11 and a pair of the separators 12 in a state of supporting (holding) the sheet body 11 therebetween, the sectional view being taken along a plane that includes line 2-2 of FIG. 2 parallel with the y-axis and is in parallel with the y-z plane. As described previously, the fuel cell 10 is formed by stacking the sheet bodies 11 and the separators 12 in alternating layers.

For convenience of description, of the paired separators 12, the separator 12 adjacent to the lower side of the sheet body 11 is referred to as a lower separator 121, and the separator 12 adjacent to the upper side of the sheet body 11 is referred to as an upper separator 122. As shown in FIG. 4, the lower separator 121 and the upper separator 122 are coaxially arranged such that the lower frame portion 12c of the upper separator 122 is located above the upper frame portion 12b of the lower separator 121 in a mutually facing manner.

The entire perimetric portion of the sheet body 11 is sandwiched between the upper frame portion 12b (perimetric portion) of the lower separator 121 and the lower frame portion 12c (perimetric portion) of the upper separator 122. At this time, the sheet body 11 is arranged such that the air electrode layer 11c faces the upper surface of the plane portion 12a of the lower separator 121 and such that the fuel electrode layer 11b faces the lower surface of the plane portion 12a of the upper separator 122.

The entire perimetric portion of the sheet body 11 and the entire perimetric portion of the upper frame portion 12b of the lower separator 121, as well as the entire perimetric portion of the sheet body 11 and the entire perimetric portion of the lower frame member 12c of the upper separator 122, are sealed (bonded) to one another in an electrically insulated manner, whereby they are fixed to each another so as to make the relative movement impossible. A crystallized glass (may have an amorphous region left) is used as the seal material 13.

Thus, as shown in FIG. 4, the upper surface of the plane portion 12a of the lower separator 121, the inner wall surface of the upper frame portion 12b (the perimetric frame portion 12b1 and the jutting portion 12b2) of the lower separator 121, and the lower surface of the air electrode layer 11c of the sheet body 11 define an air channel 21 through which a gas containing oxygen (air) flows. The gas containing oxygen flows into the air channel 21 through the through-hole TH of the upper separator 122 and the cell through-hole 11d of the sheet body 11 as indicated by an arrow of a broken line in FIG. 4.

Similarly, the lower surface of the plane portion 12a of the upper separator 122, the inner wall surface of the lower frame portion 12c (the perimetric frame portion 12c1 and the jutting portion 12c2) of the upper separator 122, and the upper surface of the fuel electrode layer 11b of the sheet body 11 define a fuel channel 22 through which a fuel containing hydrogen flows. The fuel flows into the fuel channel 22 through the through-hole TH of the lower separator 121 and the cell through-hole 11d of the sheet body 11 as indicated by an arrow of a solid line in FIG. 4.

As shown in FIG. 4, the SUS mesh 31 (e.g., having an emboss structure), which is a flat sheet-like metal mesh (corresponding to the "conductive member") made of stainless steel (specifically, ferritic SUS) is confined in the air channel 21. The wire diameter of the SUS mesh 31 is, e.g., from 0.05 to 0.5 mm. The "conductive member" made of ferritic SUS may be expand-metal, other than mesh. In this case, the sheet thickness is, e.g., from 0.05 to 0.5 mm. It is preferable to use, for example, ZMG232L manufactured by Hitachi, as the ferritic SUS, which is a material for "conductive member."

The upper end (upper salient) and the lower end (lower salient) of the SUS mesh 31 contact the lower surface of the air electrode layer 11c of the sheet body 11 and the upper surface of the plane portion 12a of the lower separator 121, respectively. More specifically, as will be described later, the upper end of the SUS mesh 31 is fixed and electrically connected to the air electrode layer 11c through an Ag fired film, and the lower end of the SUS mesh 31 is fixed and electrically connected to the lower separator 121 by means of welding (or diffusion bonding). As will be described in detail later, for the SUS mesh 31, before being confined in the air channel 21, Ag-plating treatment and vacuum heat-treatment had been previously performed.

Similarly, the Ni mesh 32 (e.g., having an emboss structure), which is a flat sheet-like metal mesh made of Ni, is confined in the fuel channel 22. The wire diameter of the Ni mesh 32 is, e.g., from 0.05 to 0.5 mm. The upper end and the lower end of the Ni mesh 32 contact the lower surface of the plane portion 12a of the upper separator 122 and the upper surface of the fuel electrode layer 11b of the sheet body 11, respectively. More specifically, as will be described later, the upper end of the Ni mesh 32 is fixed and electrically connected to the upper separator 122 by means of welding (or diffusion bonding), and the lower end of the Ni mesh 32 is fixed and electrically connected to the fuel electrode layer 11b through an Ni fired film.

Thus, by virtue of the confinement of the SUS mesh 31 within the air channel 21, the electrical connection between the lower separator 121 and (the air electrode layer 11c of) the sheet body 11 can be secured, and by virtue of the confinement of the Ni mesh 32 within the fuel channel 22, the electrical connection between the upper separator 122 and (the fuel electrode layer 11b of) the sheet body 11 can be secured. Further, since the metal meshes 31, 32 are confined, the flow channel of a gas is restricted. As a result, the area (circulation area), viewed from the plane, where the electricity-generating reaction can substantially be produced due to the circulation of the gas can be increased in the air channel 21 and the fuel channel 22, whereby the electricity-generating reaction can effectively be generated in the sheet body 11.

Figure 5:
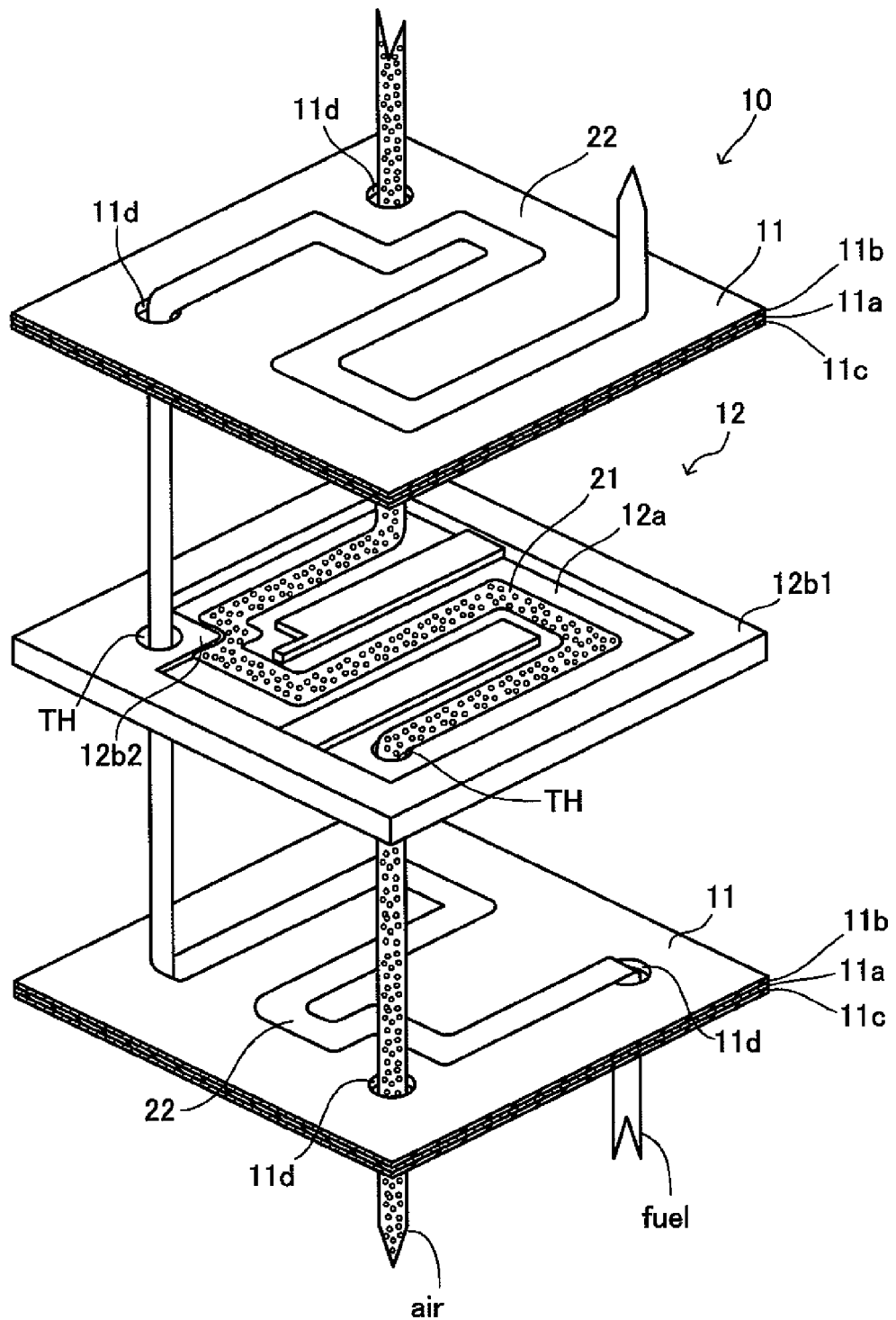
FIG. 5 is a view for explaining a circulation of fuel and air in the fuel cell shown in FIG. 1.

In the thus-configured fuel cell 10, as shown in FIG. 5, the fuel is supplied to the fuel channel 22, while air is supplied to the air channel 21, whereby electricity is generated while utilizing the chemical reactions expressed below by Formulas (1) and (2).

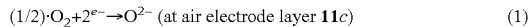

$$(1/2)\cdot O_2 + 2e^- \rightarrow O^{2-} \text{ (at air electrode layer } 11c\text{)} \tag{1}$$

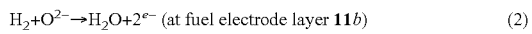

$$H_2 + O^{2-} \rightarrow H_2O + 2e^- \text{ (at fuel electrode layer } 11b\text{)} \tag{2}$$

Since the fuel cell (SOFC) 10 utilizes oxygen conductivity of the solid electrolyte layer 11a for generating electricity, the working temperature of the fuel cell 10 is generally 600° C. or higher. Accordingly, the temperature of the fuel cell 10 is raised from room temperature to the working temperature (e.g., 800° C.) by means of an external heating mechanism (e.g., a heating mechanism that uses a resistance heater or a heating mechanism that utilizes heat generated through combustion of a fuel gas).

The length of one side A of the planar shape (=square) of the sheet body 11 (accordingly, the separator 12) is 1.1 cm or more and 11 cm or less in the present embodiment. The thickness t1 of the sheet body 11 is uniform all over. In the present embodiment, the thickness t1 is 20 μm or more and 500 μm or less. The thickness of the fuel electrode layer 11b is greater than the thickness of the solid electrolyte layer 11a and the thickness of the air electrode layer 11c. Specifically, the rigidity of the fuel electrode layer 11b is the greatest among three layers, so that the fuel electrode layer 11b can serve as a support layer of the sheet body 11. For example, the thickness of the electrolyte layer 11a is 1 μm or more and 50 μm or less, the thickness of the fuel electrode layer 11b is 5 μm or more and 500 μm or less, and the thickness of the air electrode layer 11c is 5 μm or more and 200 μm or less.

The length L of one side of the planar shape (=square) of the plane portion 12a of the separator 12 is 1 cm or more and 10 cm. or less in the present embodiment. The width ((A−L)/2) of the "frame portion" (perimetric portion) of the separator 12 is 0.05 cm or more and 0.5 cm or less. Accordingly, the area of the plane portion 12a of the separator 12 as viewed in plane is 1 $cm^2$ or more and 100 $cm^2$ or less. The thickness t2 of the "frame portion" (perimetric portion) of the separator 12 is 200 μm or more and 1000 μm or less. The thickness tz of the plane portion 12a of the separator 12 is 50 μm or more and 100 μm or less.

Manufacturing and Assembly of Fuel Cell

Next, one example of a method of manufacturing and assembling the fuel cell 10 will be described.

Manufacturing Individual Members

Firstly, the manufacture of the individual members used for the assembly of the fuel cell 10 will be described.

Manufacturing Sheet Body

Firstly explained is the case in which the sheet body 11 used for the assembly of the fuel cell 10 is a fuel-electrode-support-type (the fuel electrode layer serves as a support substrate). In this case, a sheet (that is to become the fuel electrode layer 11b) made of NiO and YSZ is firstly prepared. Then, a ceramic sheet (YSZ tape) prepared by a green sheet process is laminated on the lower surface of the sheet. The resultant laminate is fired at 1400° C. for one hour. Subsequently, a sheet (that is to become the air electrode layer 11c) is formed by a printing process on the lower surface of the resultant laminate (fired body), and the resultant laminate is fired at 850° C. for one hour. Thus, the sheet body 11 (before the reduction process) is formed. In this case, instead of using the YSZ tape, a ceramic sheet may be formed by a printing process on the lower surface of the sheet (that is to become the fuel electrode layer 11b) made of NiO and YSZ. Further, a ceria layer ($CeO_2$) serving as a reaction preventing layer may be formed between the electrolyte layer and the air electrode layer. As a ceria, GDC (gadolinium doped ceria), SDC (samarium doped ceria) or the like may be used. Further, zircon having small thermal expansion coefficient may be added to the fuel electrode layer. By virtue of the addition of zircon, the mean thermal expansion coefficient of the fuel electrode layer is reduced, whereby the difference in the thermal expansion coefficient between the fuel electrode layer and the air electrode layer can be reduced. As a result, the warpage on the sheet body caused by the difference in thermal expansion coefficient between the layers in the sheet body can be reduced.

Manufacturing Separator

The separator 12 used for the assembly of the fuel cell 10 can be formed from a Ni-based heat-resistant alloy (e.g., ferritic SUS, INCONEL 600, HASTELLOY or the like) by a well-known technique such as etching or cutting.

Manufacturing Metal Mesh

The flat sheet-like SUS mesh 31 and the Ni mesh 31 used for the assembly of the fuel cell 10 can be formed from stainless steel (specifically, ferritic SUS) and Ni, respectively, by a well-known technique.

Ag-Plating and Vacuum Heat-Treatment on SUS Mesh

For the SUS mesh 31, in the air and at a high temperature, chromia ($Cr_2O_3$), which is an oxide having large electrical resistance, layer may be formed due to oxidation. Accordingly, when the SUS mesh 31 is subjected in the air and at a high temperature during the heat-treatment (will be described later) in the fabrication process of the stack structure, or during the operation of the fuel cell 10, chromia may be formed on the surface of the SUS mesh 31. Particularly, the formation of chromia layer on the surface of the upper end of the SUS mesh 31 (i.e., on the surface of the portion electrically connected to the air electrode layer 11c) leads to the increase in the electrical resistance of the fuel cell 10 as a whole and thereby the decrease in the output of the fuel cell 10 as a whole.

Therefore, it is preferred that, on the surface of the SUS mesh 31, an electrically conductive oxygen barrier layer for suppressing the oxidation of the surface while maintaining the electrical conductivity of the SUS mesh 31. In addition, for the Ni mesh 32, in the air and at a high temperature, an oxide may be formed due to oxidation. However, with a reduction process, the oxide is also reduced when NiO within the fuel electrode layer 11b is reduced. Accordingly, for the Ni mesh 32, it is not so necessary to daringly form an oxygen barrier layer on its surface. As described above, in the present embodiment, as shown in FIG. 6, only for the SUS mesh 31 manufactured as described above (by itself before fabrication) (refer to FIG. 6(a)), the treatments shown in FIG. 6(b), (c) are performed in order for forming an oxygen barrier layer.

As shown in FIG. 6(b), first, the surface (whole surface) of the SUS mesh 31, at room temperature, a well-known Ag-plating treatment is performed, and thereby an Ag-plated layer is formed on the whole surface of the SUS mesh 31. The thickness of the Ag-plated layer is 1 to 20 μm. Since the Ag-plated layer is dense (with low porosity), it is expected that Ag-plated layer functions as an oxygen barrier layer once Ag-plating is performed. However, as will be described later, it was revealed that, with only the Ag-plating treatment, during the subsequent fabrication process of the fuel cell 10, or during the operation of the fuel cell 10, when the SUS mesh 31 is placed at a high temperature, chromia may be still formed on the surface of the SUS mesh 31 (i.e., at the boundary between the SUS mesh 31 and the Ag-plated layer). It is believed that this is because the detachment of the Ag-plated layer occurs due to the difference of the coefficients of thermal expansion between the SUS mesh 31 and the Ag-plated layer and, through the detached region, the surface of the SUS mesh 31 is provided with oxygen.

Therefore, in the present embodiment, as shown in FIG. 6(c), for the SUS mesh after Ag-plating treatment, a vacuum heat-treatment (corresponding to the "first heat-treatment") is further performed. The vacuum heat-treatment referred hereto is a treatment wherein the SUS mesh 31 is placed in an atmosphere adjusted to a negative pressure lower than an atmospheric pressure with well-known vacuum oven and a high temperature with heating. The optimal degree of the vacuum and the optimal temperature and period of the heat-treatment in the vacuum heat-treatment will be described later.

It has been revealed that after the SUS mesh 31 is further subjected to the vacuum heat-treatment in addition to the Ag-plating treatment as described above, it becomes difficult to form chromia on the surface of the SUS mesh 31 (i.e., at the boundary between the SUS mesh 31 and the Ag-plated layer), even though the SUS mesh 31 is placed at a high temperature, during the subsequent fabrication process of the fuel cell 10, or during the operation of the fuel cell 10 (will be described in detail). It is believed that this is because, in a negative pressure condition where the concentration of oxygen is low in the atmosphere (i.e., a condition wherein even if the Ag-plated layer detached, it is difficult to provide the surface of the SUS mesh 31 with oxygen), the boundary between the SUS mesh 31 and the Ag-plated layer is reacted and integrated by the heat-treatment, and thereby a strong oxygen barrier layer is formed on the surface of the SUS mesh 31.

Assembly of Stack Structure

After the necessary number of the sheet body 11 and the separator 12, the SUS mesh 31 and the Ni mesh 32 are prepared as described above, the assembly of the fuel cell 10 progresses as described below. The assembly of the fuel cell 10 will be described with reference to FIGS. 7 to 10. FIGS. 7 to 10 are vertical sectional schematic views of the sheet body 11 and a pair of separators 12, which supports (holds) the sheet body 11 (the upper separator 122 and the lower separator 121) and the metal meshes 31 and 32, taken along a plane that includes line 3-3 parallel with a x axis of FIG. 2 and is in parallel with a x-z plane. The line 3-3 passes the center (=the center of the planar shape (=square) of the sheet body 11) of the planar shape (=square) of the separator 12.

Welding Metal Mesh to Separator

As shown in FIG. 7, the lower end of the SUS mesh 31 (after the Ag-plating treatment and the vacuum heat-treatment) is fixed to the upper surface of the plane portion 12a of the lower separator 121 by means of welding (or diffusion bonding). Thereby, the reliability of the electrical connection between the SUS mesh 31 and the lower separator 121 is secured. As a result of the welding (or diffusion bonding), oxygen cannot be supplied to the surface of the lower end of the SUS mesh 31 (i.e., the boundary between the SUS mesh 31 and the Ag-plated layer, the surface of electrical connection portion). Accordingly, during the subsequent fabrication process of the fuel cell 10, and during the operation of the fuel cell 10, even though the SUS mesh 31 is placed at a high temperature, chromia will not be formed on the surface of the lower end of the SUS mesh 31 (i.e., the surface of the electrical connection portion to the lower separator 121).

Similarly, the upper end of the Ni mesh 32 is fixed to the lower surface of the plane portion 12a of the upper separator 122 by means of welding (or diffusion bonding). Thereby, the reliability of the electrical connection between the Ni mesh 32 and the upper separator 122 is secured.

Coating Adhesive Paste on Sheet Body

Figure 8A:
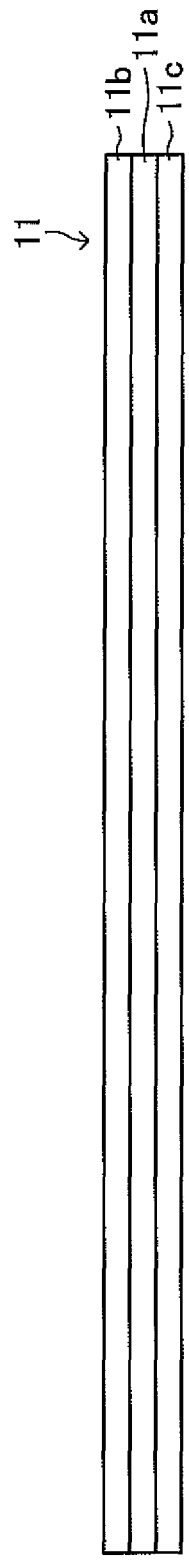
FIG. 8 is a schematic view, showing pastes being coated on a thin sheet body.
Figure 8B:
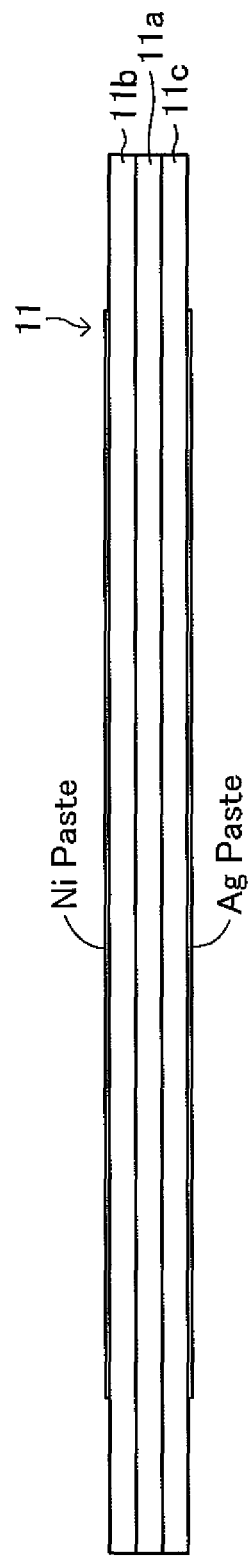

Then, as shown in FIG. 8, for the sheet body 11 (refer to FIG. 8(a)) manufactured as described above (a solitary sheet body before fabrication), on the upper surface thereof (i.e., the upper surface of the fuel electrode layer 11b), an Ni paste (a paste containing Ni powders) is coated at room temperature by a printing process or the like (refer to FIG. 8(b)). The film thickness of the Ni paste is 5 to 30 μm.

Similarly, for the sheet body 11 (refer to FIG. 8(a)) manufactured as described above (a solitary sheet body before fabrication), on the lower surface thereof (i.e., the lower surface of the air electrode layer 11c), an Ag paste (a paste containing Ag powders) is coated at room temperature by a printing process or the like (refer to FIG. 8(b)). The film thickness of the Ag paste is 5 to 30 μm.

Coating Sealant on Separator

Then, as shown in FIG. 9, a crystallized glass material (e.g., slurry of borosilicate crystallized glass) that is to become the seal material 13 is applied to a pair of the separators 12 welded with the metal meshes 31, 32 (after the Ag-plating treatment and the vacuum heat-treatment) at regions of its perimetric portion that comes into contact with respective sheet bodies 11 for holding the sheet bodies 11 (i.e., the glass material is applied to the lower surface of the lower frame portion 12c, to the upper surface of the upper frame portion 12b, and to the upper and lower surfaces of the perimetric portion of the separator 12) at room temperature. Alternatively, a crystallized glass material (e.g., slurry of borosilicate crystallized glass) that is to become the seal material 13 may be applied to the sheet bodies 11 at regions of its perimetric portion that is held by the upper and lower separators 12 (i.e., the glass material may be applied to the upper and the lower surfaces of the perimetric portion of the sheet body 11) at room temperature.

Stacking Step

Then, as shown in FIG. 10, the separators 12 and the sheet bodies 11 are stacked in alternating layers. Thus, the laminated body (stack structure), in which the sheet bodies 11 and the separators 12 are stacked in alternating layers with the crystallized glass material interposed between the perimetric portion of the sheet body 11 and the perimetric portion of the separator 12 adjacent to the sheet body 11, is obtained.

Figure 11:
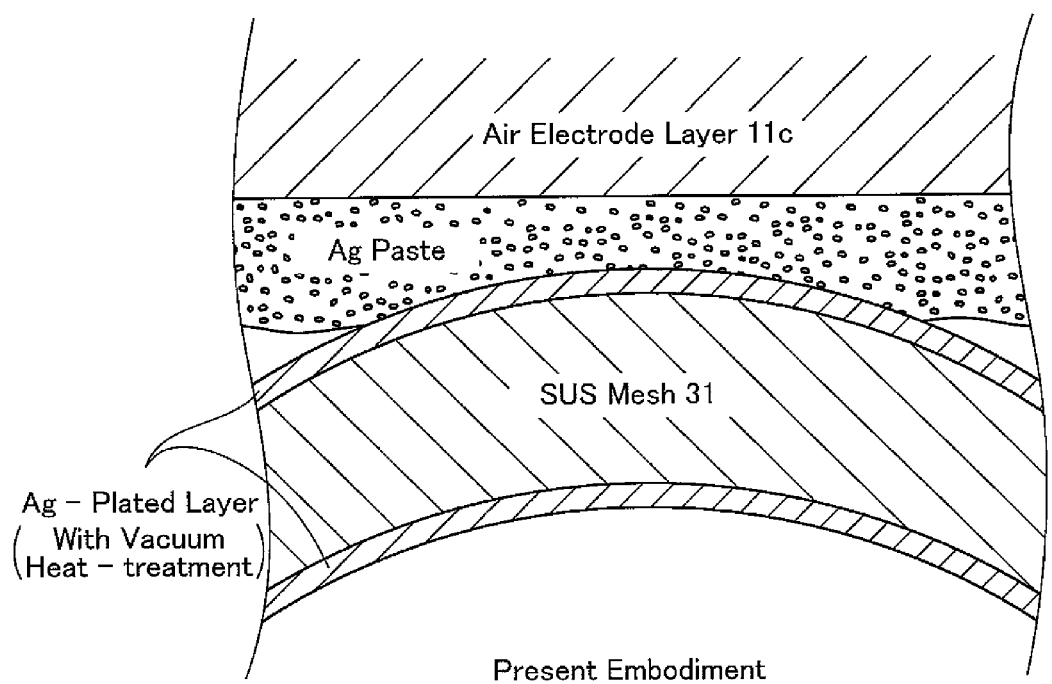
FIG. 11 is an enlarged view, showing an electrical connection between a SUS mesh layer and an air electrode layer.

In addition, the upper end of the SUS mesh 31 (after the Ag-plating treatment and the vacuum heat-treatment) contacts the Ag paste film coated on the lower surface of the air electrode layer 11c. Thus, as shown in FIG. 11, which is an enlarged view of the Z portion in FIG. 10, the state, in which the air electrode layer 11c and the upper end of the SUS mesh 31 contact each other through the Ag paste, is obtained.

Similarly, the lower end of the Ni mesh 32 contacts the Ni paste film coated on the upper surface of the fuel electrode layer 11b. Thus, the state, in which the fuel electrode layer 11b and the lower end of the Ni mesh 32 contact each other through the Ni paste, is obtained.

Heat-treatment

Next, the resultant stack structure is subject to a heat treatment (corresponding to the "second heat-treatment"), whereby the temperature of the stack structure is kept to be a predetermined temperature (e.g., 830° C.) for a predetermined time (e.g., 1 hr). As a result, the perimetric portion of the sheet body 11 and the perimetric portion of the separator 12 adjacent to the sheet body 11 are integrated and sealed (bonded). Consequently, the fuel channels 22 and the air channels 21 are airtightly formed and defined by the crystallized glass.

In addition, the Ag paste film is solidified to be an Ag fired film. Thus, the upper end of the SUS mesh 31 (after the Ag-plating treatment and the vacuum heat-treatment) is fixed with the lower surface of the air electrode layer 11c through the Ag fired film, and electrically connected with the air electrode layer 11c. Thus, by means of the Ag fired layer interposed between the SUS mesh 31 and the air electrode layer 11c, the reliability of the electrical connection between the SUS mesh 31 and the air electrode layer 11c is secured.

Similarly, the Ni paste film is solidified to be an Ni fired film. Thus, the lower end of the Ni mesh 32 is fixed with the upper surface of the fuel electrode layer 11b through the Ni fired film, and electrically connected with the fuel electrode layer 11b. Thus, by means of the Ni fired layer interposed between the Ni mesh 32 and the fuel electrode layer 11b, the reliability of the electrical connection between the Ni mesh 32 and the fuel electrode layer 11b is secured.

Reduction Process Step

Next, the stack structure is again subject to a heat treatment, so that the temperature of the stack structure is kept to be a predetermined temperature for a predetermined time. Simultaneously, a reduction gas (hydrogen gas in this embodiment) is introduced into the fuel channels 22. The reduction process is performed to the fuel electrode layers 11b due to the introduction of the reduction gas, whereby, of NiO and YSZ constituting the fuel electrode layer 11b, NiO is reduced. As a result, the fuel electrode layer 11b becomes a Ni—YSZ cermet, thereby being capable of serving as a fuel electrode (anode electrode). Thus, the assembly of the fuel cell 10 is completed.

Effect of Ag-Plating Treatment and Vacuum Heat-Treatment

As described above, in the present embodiment, the Ag-plating treatment and the vacuum heat-treatment are performed on the SUS mesh 31, and thereby a strong oxygen barrier layer is formed on the surface of the SUS mesh 31. Then, during the fabrication process of the fuel cell 10, in the state, in which the SUS mesh 31 is connected with the air electrode layer 11c through the Ag paste film, the above-described heat-treatment (corresponding to the "second heat-treatment") is performed, wherein the SUS mesh is placed at a high temperature. Further, also when the fuel cell 10 operates after the completion of the assembly of the fuel cell 10, the SUS mesh is placed at a high temperature.

In the present embodiment, since the above-described strong oxygen barrier layer has been formed, even though the SUS mesh 31 is placed at a high temperature during the above-described fabrication process of the fuel cell 10, and during the operation of the fuel cell 10, no (or little) chromia is formed on the surface of the electrical connection portion with the Ag fired film (i.e., the air electrode layer 11c) (at the boundary between the SUS mesh 31 and the Ag-plated layer). Accordingly, the increase in the electrical resistance (internal resistance) of the fuel cell 10 as a whole due to the formation of chromia does not occur and, as a result, the decrease in the output of the fuel cell 10 as a whole due to the formation of chromia does not occur. In addition, the decrease in the output of the fuel cell 10 as a whole due to the "chromium poisoning" (described above) of the air electrode layer 11c can be suppressed as well.

Figure 12:
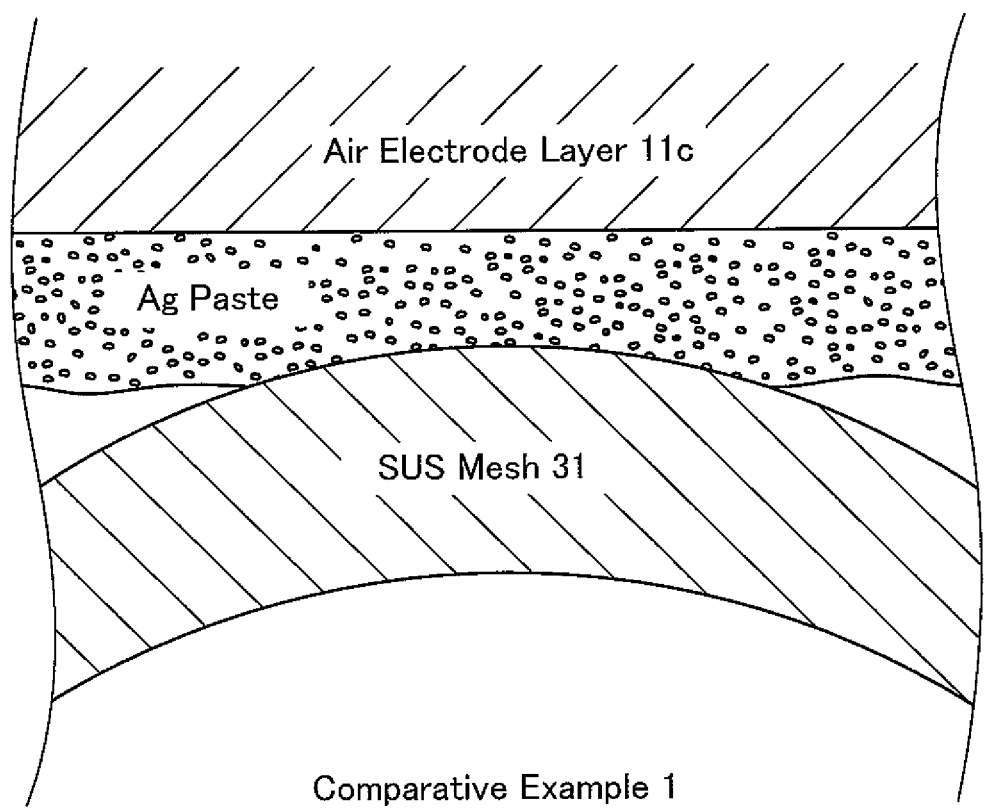
FIG. 12 is a view corresponding to FIG. 11, according to a Comparative Example 1 wherein an Ag paste is used as an adhesive paste and Ag is not plated.
Figure 13:
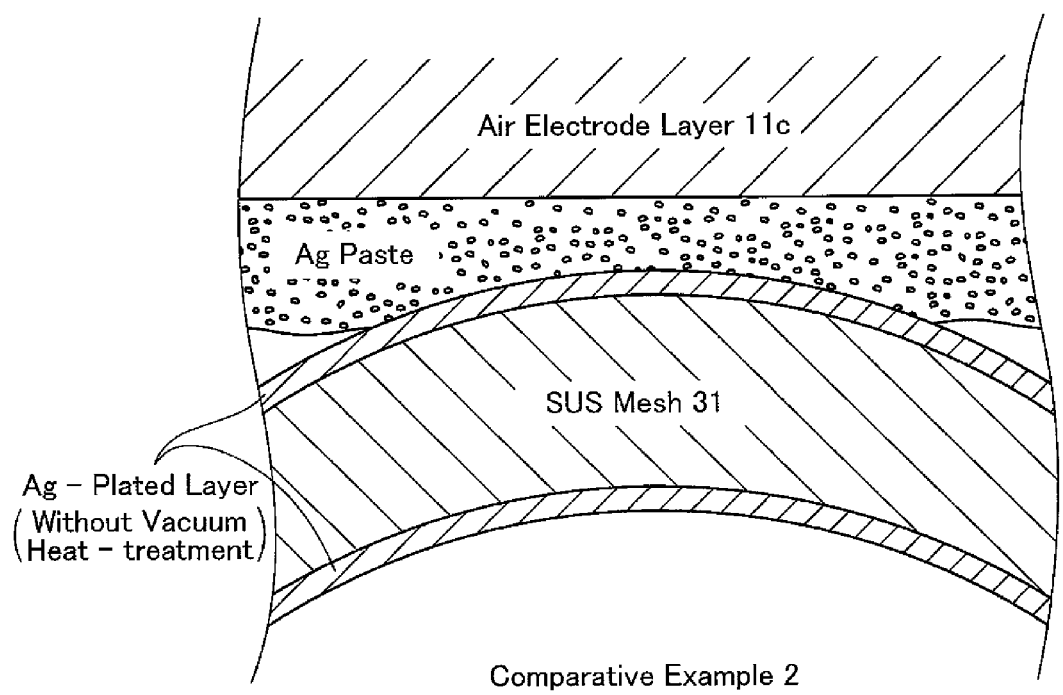
FIG. 13 is a view corresponding to FIG. 11, according to a Comparative Example 2 wherein an Ag paste is used as an adhesive paste and Ag is plated while a vacuum heat treatment is not performed.
Figure 14:
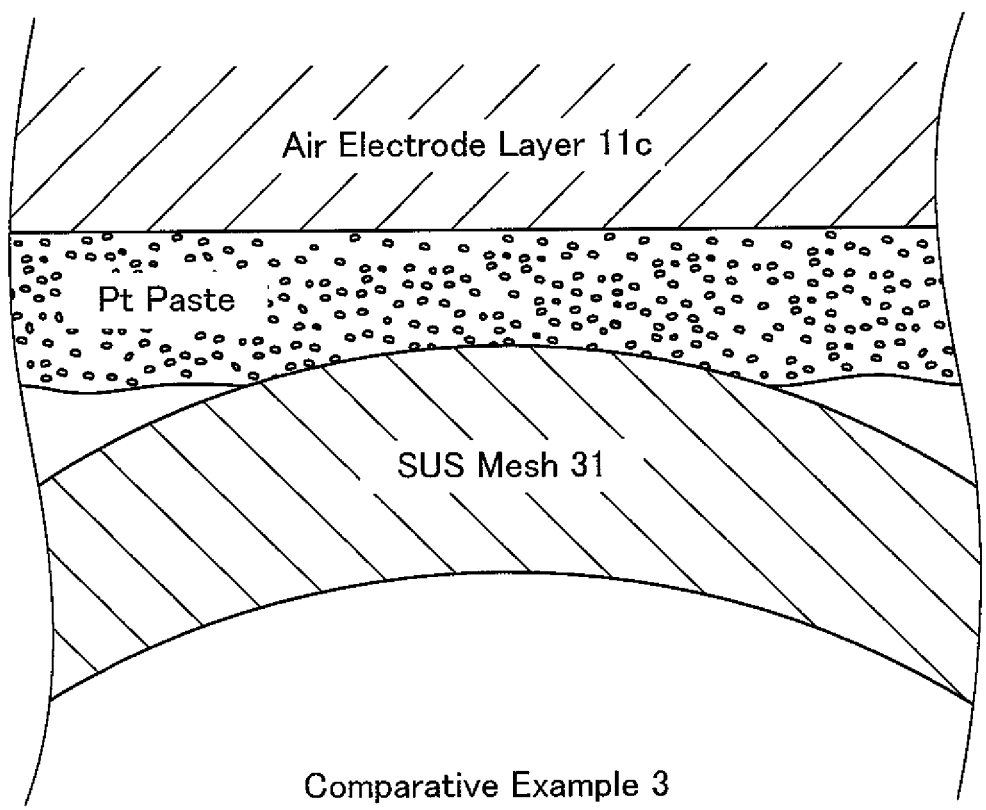
FIG. 14 is a view corresponding to FIG. 11, according to a Comparative Example 3 wherein a Pt paste is used as an adhesive paste instead of an Ag paste and Ag is not plated.

The two experiments conducted in order to confirm this operation will be described below. In these two experiments, in order to compare the structures of electrical connection between the SUS mesh 31 and the air electrode layer 11c with that of the present embodiment, the following three comparative examples (Comparative Examples 1 to 3) shown in FIG. 12 through FIG. 14 corresponding to FIG. 11 were introduced. In these three comparative examples, the surface treatments of the SUS mesh 31 or the types of the adhesive paste are different from those in the present embodiment.

Specifically, in Comparative Example 1 (refer to FIG. 12), neither the Ag-plating treatment nor the vacuum heat-treatment has been performed on the SUS mesh 31 and, in this point, Comparative Example 1 is different from the present embodiment. Accordingly, in Comparative Example 1, the SUS mesh 31, on which neither the Ag-plating treatment nor the vacuum heat-treatment has been performed, is placed in a high temperature in the state in which it is connected to the air electrode layer 11c through the Ag paste film.

In Comparative Example 2 (refer to FIG. 13), the vacuum heat-treatment has not been performed on the SUS mesh 31 and, in this point, Comparative Example 2 is different from the present embodiment. Accordingly, in Comparative Example 2, the SUS mesh 31, on which the Ag-plating treatment has been performed, but the vacuum heat-treatment has not been performed, is placed in a high temperature in the state in which it is connected to the air electrode layer 11c through the Ag paste film.

In Comparative Example 3 (refer to FIG. 14), neither the Ag-plating treatment nor the vacuum heat-treatment has been performed on the SUS mesh 31 and the Pt paste has been used instead of the Ag paste, and, in these points, Comparative Example 3 is different from the present embodiment. Accordingly, in Comparative Example 3, the SUS mesh 31, on which neither the Ag-plating treatment nor the vacuum heat-treatment has been performed, is placed in a high temperature in the state in which it is connected to the air electrode layer 11c through the Pt paste film.

First Experiment

Figure 15:
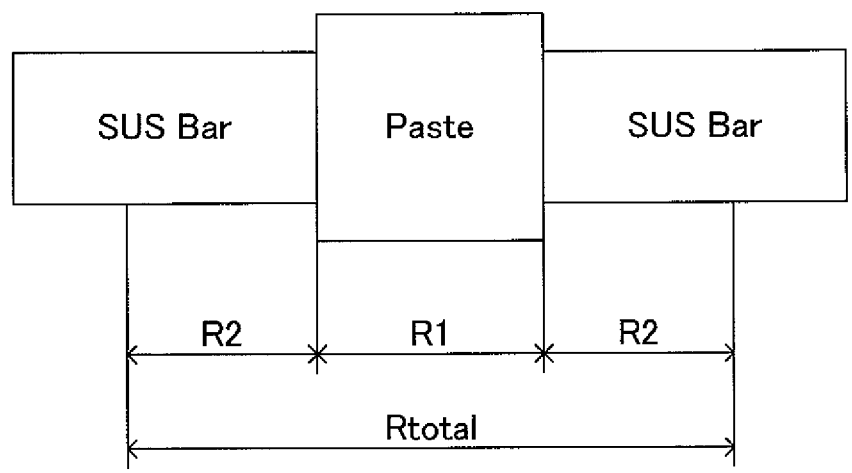
FIG. 15 is a schematic view showing an experimental apparatus for verifying the effect of the formation of oxygen barrier layer.

In the first experiment, the apparatus, whose schematic configuration is shown in FIG. 15 summarily showing the structure of electrical connection between the SUS mesh 31 and the Ag fired film (accordingly, the air electrode layer) in the present embodiment, was used. In this apparatus, two rod-like members (SUS bars) made of stainless steel, having a same shape with a square cross-section, are coaxially placed in a state in which they are connected through an adhesive paste. After placing the apparatus in the air, for a predetermined time (1 hr) and at a predetermined temperature (850° C.) to fire the adhesive paste, the resistance value, Rtotal, between predetermined regions on the respective two SUS bars is measured. In each SUS bar, the resistance value, $R_2$, between the predetermined region and the "electrical connection region with the adhesive fired body (fired body of the adhesive paste)" is known. Accordingly, by measuring the resistance value Rtotal, the resistance value, R1, between the "electrical connection regions with the adhesive fired body" for the respective two SUS bars can be measured.

Accurately, the resistance value R1 is a sum of an internal resistance (bulk resistance) of the adhesive fired body and the resistances (interfacial resistances) at the respective "boundaries with the adhesive fired body" on the two SUS bars. However, the bulk resistance is sufficiently smaller than the interfacial resistances. Therefore, it can be assumed that the resistance value R1 may be determined mainly based on the interfacial resistances. In the first experiment, to the apparatus, the above-described present embodiment and Comparative Examples 1 to 3 are applied, and the respective resistance values, R1s, are evaluated. The resistance value R1 increases due to the formation of chromia on the surface of the electrical connection portion with the adhesive fired body on the SUS bars.

Specifically, in the first experiment, SUS bars in a size of 5 mm×5 mm×20 mm and with its surface finished with sandpaper with a roughness of #800 were used. The thickness of the plated layer was adjusted by controlling the film-forming condition. The thickness of the adhesive fired body (=the distance between the respective "boundaries with the adhesive fired body" on the two SUS bars) was adjusted to be constantly 50 μm by controlling the pressure during the heat-treatment for firing the adhesive paste.

In the case of the present embodiment, an Ag-plated layer with a thickness of 10 μm was formed on the whole surface of the two SUS bars (as a base layer, an extremely thin Ni-plated layer being formed). On the two SUS bars after the plating treatment, the vacuum heat-treatment was performed. As the vacuum heat-treatment, under a vacuum atmosphere of $1×10^{-3}$ Pa, at 800° C., for 1 hr, a heat-treatment was performed. The two SUS bars after the plating treatment and the vacuum heat-treatment were bonded through the Ag paste. On the bonded body, the above-described heat-treatment (800° C., 1 hr) is performed to fire the Ag paste. In this state, the resistance value R1 is measured.

In the case of Comparative Example 1, the two SUS bars, on which neither the plating treatment nor the vacuum heat-treatment had been performed, were bonded through the Ag paste. On the bonded body, the above-described heat-treatment (850° C., 1 hr) is performed to fire the Ag paste. In this state, the resistance value R1 is measured.

In the case of Comparative Example 2, an Ag-plated layer was formed on the whole surface of the two SUS bars (on which an extremely thin Ni-plated layer had been formed as a base layer). The two SUS bars, on which the plating treatment had been performed, but the vacuum heat-treatment had not been performed, were bonded through the Ag paste. On the bonded body, the above-described heat-treatment (850° C., 1 hr) is performed to fire the Ag paste. In this state, the resistance value R1 is measured.

In the case of Comparative Example 3, the two SUS bars, on which neither the plating treatment nor the vacuum heat-treatment had been performed, were bonded through the Pt paste. On the bonded body, the above-described heat-treatment (850° C., 1 hr) is performed to fire the Pt paste. In this state, the resistance value R1 is measured.

Figure 27:
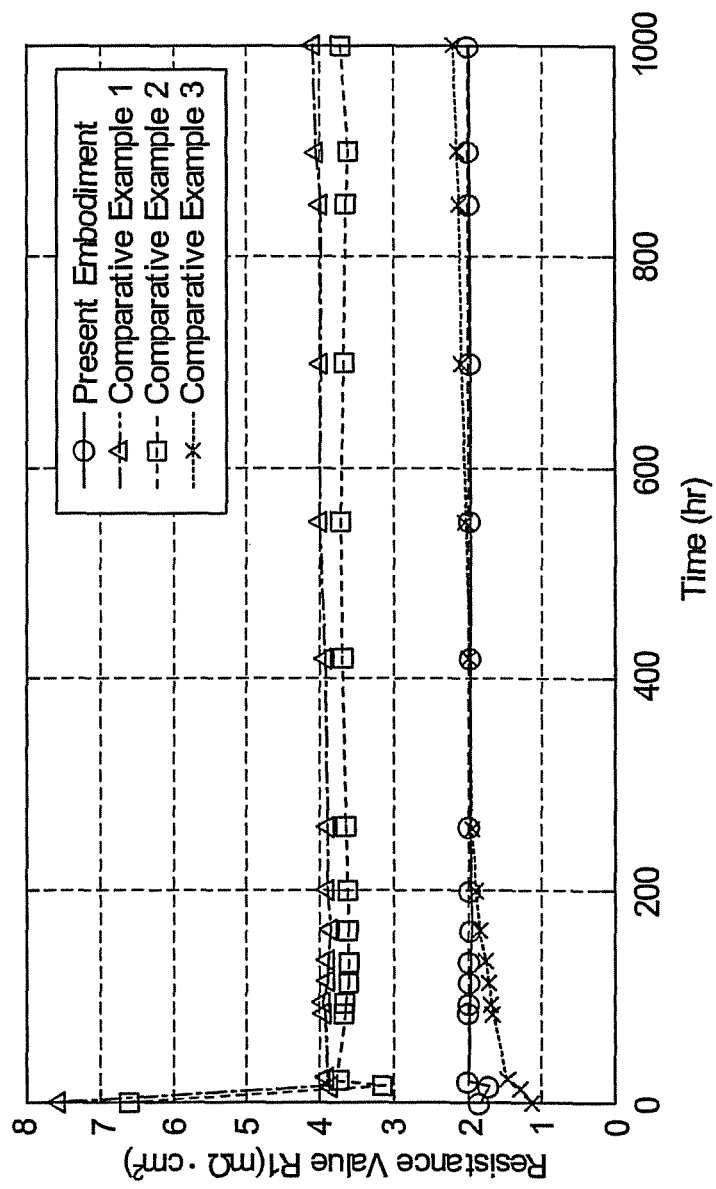
FIG. 27 is a graph showing the results of resistance values, R1, measured in the first experiment.

The resistance values, R1s, (specifically, the resistant values, Rtotals) were measured by using a well-known direct current four terminal method. The atmospheric temperature on the measurement was 750° C. The resistance values, R1s, were measured from the beginning of the measurement to 1000 hrs. The results of the resistance values, R1, measured in this first experiment are shown in FIG. 27. In FIG. 27, the resistance values, R1s, are indicated in the unit of $mΩ·cm^2$ after considering the area of the bonded surface between the SUS bars and the adhesive fired body.

As shown in FIG. 27, in the cases of Comparative Examples 1 and 2, the initial resistances were very large, and the R1s became steady after dozens hours have passed. However, this steady resistant values are still very large as compared with that in the case of the present embodiment. On the other hand, in the case of Comparative Example 3, although the initial resistance is very small as compared with that in the case of the present embodiment, the R1 tends to increase with time. To the contrary, in the case of the present embodiment, although the initial resistance is large as compared with Comparative Example 3, the R1 remains very steady from the beginning of the measurement to 1000 hrs. The growth rate (degradation rate) of the R1 from the beginning of the measurement after 1000 hrs have passed is nearly zero. In addition, after 500 hrs have passed, the R1 becomes smaller than that in the case of Comparative Example 3. The above result of the first experiment reveals that the present embodiment, which has a small resistance value R1 and can make the resistance value R1 steady from the beginning to long term, is most preferable.

The significance for measuring the resistance value R1 from the beginning of the measurement to 1000 hrs will be described below. Recently, as applications of a solid oxide fuel cell (SOFC), mobile power supplies, dispersed power sources, stationary power supplies and the like have been intended. In these fields, a long-term durability around thousands hrs to dozens thousand hrs is required. Specifically, for example, in the case of stationary power supplies, "the degradation rate of 10% or less in a resistance value after 40000 hrs" may be required as a development objective, and, in this case, the development objective becomes "the degradation rate of 0.25% or less in a resistance value" when converted into that after 1000 hrs. Thus, a steadiness in resistance value for at least about 1000 hrs is essential. Accordingly, from such a point of view, it can be concluded that the present embodiment with a very high steadiness of a resistance value is superior to Comparative Example 3 with a resistance value increasing with time.

In addition, as shown in FIG. 27, in the case of the present embodiment, and in the case of Comparative Example 3, as compared with Comparative Examples 1 and 2, the resistance values, R1s, are small. This means that, in the case of the present embodiment, and in the case of Comparative Example 3, little chromia is formed on the surface of the electrical connection portion with the adhesive fired body on the SUS bars (in Comparative Example 3, some amount of chromia is formed with time), while, in the cases of Comparative Examples 1 and 2, much chromia is formed on the surface. Further, in the case of the present embodiment, and in the case of Comparative Example 2 (i.e., in the case where the Ag-plated layer has been formed), "the surface of the electrical connection portion with the adhesive fired body on the SUS bars" means more specifically the boundary between the SUS mesh and the Ag-plated layer, corresponding to the portion contacting the adhesive fired body on the SUS bars. By observing the surface of the electrical connection portion with the adhesive fired body on the SUS bars actually used in this first experiment, it could be confirmed that the same result as described above was obtained.

Second Experiment

In the second experiment, the stack structures were actually manufactured. In the experiment, a sheet body of a fuel-electrode-support-type (the fuel electrode layer serves as a support substrate) was used to constituting the stack structures. This sheet body is square having one side of 3 cm as viewed in plane, and includes an electrolyte layer (thickness: 3 µm) made of 8YSZ, a fuel electrode layer (thickness: 150 µm) made of NiO-8YSZ, and an air electrode layer (thickness: 15 µm) made of LSCF, those layers being stacked. As described above, a ceria (GDC and the like) layer may be interposed, as a reaction preventing layer, between the electrolyte layer and the air electrode layer. Three-layer stacks were manufactured in the stacking step by using this sheet body. In the second experiment, the output density in operation of the three-layer stacks is evaluated. Small output density of the stack results from the formation of chromia on the surface of the electrical connection portion with the metal fired film (accordingly, the air electrode layer) on the SUS mesh.

Such stack structures were respectively manufactured for the present embodiment, and Comparative Examples 1 to 3 having the structures shown in FIG. 11 to FIG. 14, and the output densities were measured for each of the stacks. The output densities were measured from the beginning of the operation to 1000 hrs at 750° C., 0.8 V, and under a gas-rich condition where the utilizations of hydrogen and oxygen were 10% or less. The thickness of the Ag-plated layer, the condition for the vacuum heat-treatment and the like in the second experiment were the same as those in the above-described first experiment. Further, the significance for measuring the output densities from the beginning of the operation to 1000 hrs in the second experiment is the same as the significance for measuring the resistance value R1 from the beginning of the measurement to 1000 hrs in the first experiment. The measurement results of the output densities of the stack structures in the second experiment are shown in FIG. 28.

Figure 28:
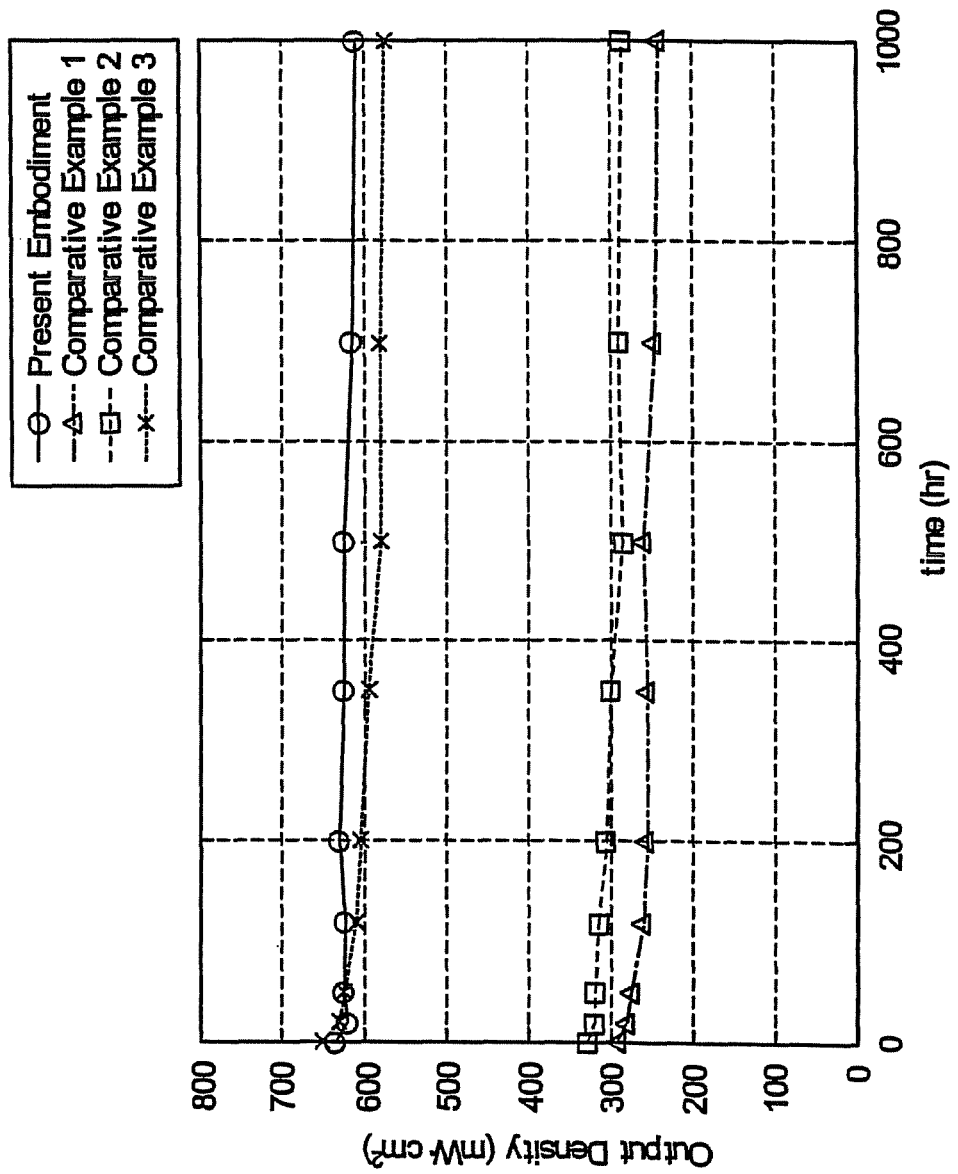
FIG. 28 is a graph showing the measurement results of the output densities of the stack structures in the second experiment.

As shown in FIG. 28, in the cases of Comparative Examples 1 and 2, both at the beginning of the operation and after 1000 hrs have passed, the output densities are small as compared with that in the present embodiment, and the output densities are decreasing with time after the beginning of the operation. On the other hand, in the case of Comparative Example 3, the output density at the beginning of the operation is comparable to that in the present embodiment, but the output density is decreasing with time. To the contrary, in the case of the present embodiment, the output density is very steady at a large value from the beginning to 1000 hrs. The reduction rate (degradation rate) of the output density from the beginning after 1000 hrs have passed is nearly zero. The above result of the second experiment reveals that the present embodiment, which has a large output density and can make the output density steady from the beginning to long term, is most preferable.

The results in FIG. 28 also mean that, in the case of the present embodiment, and in the case of Comparative Example 3, little chromia was formed on the surface of the electrical connection portion with the adhesive fired film (accordingly, the air electrode layer) on the SUS bars (in Comparative Example 3, some amount of chromia is formed with time), while, in the cases of Comparative Examples 1 and 2, much chromia was formed on the surface. Further, in the case of the present embodiment, and in the case of Comparative Example 2 (i.e., in the case where the Ag-plated layer has been formed), "the surface of the electrical connection portion with the adhesive fired film on the SUS bars" means, more specifically, the boundary between the SUS mesh and the Ag-plated layer, corresponding to the portion contacting the adhesive fired film on the SUS bars.

More specifically, as shown in FIG. 16 to FIG. 19 showing the states after the heat-treatment corresponding to FIG. 11 to FIG. 14, in the case of the present embodiment (refer to FIG. 16), even after the heat-treatment, little chromia is formed on the overall surface of the SUS mesh 31 (i.e., at the whole boundary between the SUS mesh 31 and the Ag fired layer). Accordingly, also on the surface of the electrical connection portion with the Ag fired film (accordingly, the air electrode layer 11c) on the SUS mesh 31 (at the boundary between the SUS mesh 31 and the Ag-plated layer), little chromia is formed.

In case of the Comparative Example 1 (refer to FIG. 17), after the heat-treatment, much chromia is formed on the overall surface of the SUS mesh 31. Accordingly, also on the surface of the electrical connection portion with the Ag fired film (accordingly, the air electrode layer 11c) on the SUS mesh 31 (at the boundary between the SUS mesh 31 and the Ag fired film), much chromia is formed.

In case of the Comparative Example 2 (refer to FIG. 18), after the heat-treatment, much chromia is formed on the overall surface of the SUS mesh 31 (i.e., at the whole boundary between the SUS mesh 31 and the Ag fired layer). Accordingly, also on the surface of the electrical connection portion with the Ag fired film (accordingly, the air electrode layer 11c) on the SUS mesh 31 (at the boundary between the SUS mesh 31 and the Ag-plated layer), much chromia is formed.

In case of the Comparative Example 3 (refer to FIG. 19), after the heat-treatment, much chromia is formed on the overall surface excluding the surface of the electrical connection portion with the Pt fired film (accordingly, the air electrode layer 11c) on the SUS mesh 31, while little chromia is formed on the surface of the electrical connection portion with the Pt fired film (accordingly, the air electrode layer 11c) on the SUS mesh 31 (at the boundary between the SUS mesh 31 and the Pt fired film) (some amount of chromia is formed with time).

When chromia is formed on the surface of the electrical connection portion with the metal fired film (accordingly, the air electrode layer 11c) on the SUS mesh 31, the electrical resistance of the stack structure increases. However, even when chromia is formed on the surface excluding the surface of the electrical connection portion with the metal fired film (accordingly, the air electrode layer 11c) on the SUS mesh 31, the electrical resistance of the stack structure does not increase. Accordingly, in the case of Comparative Example 3, the output density comparable to that in the present embodiment can be obtained.

Figure 17:
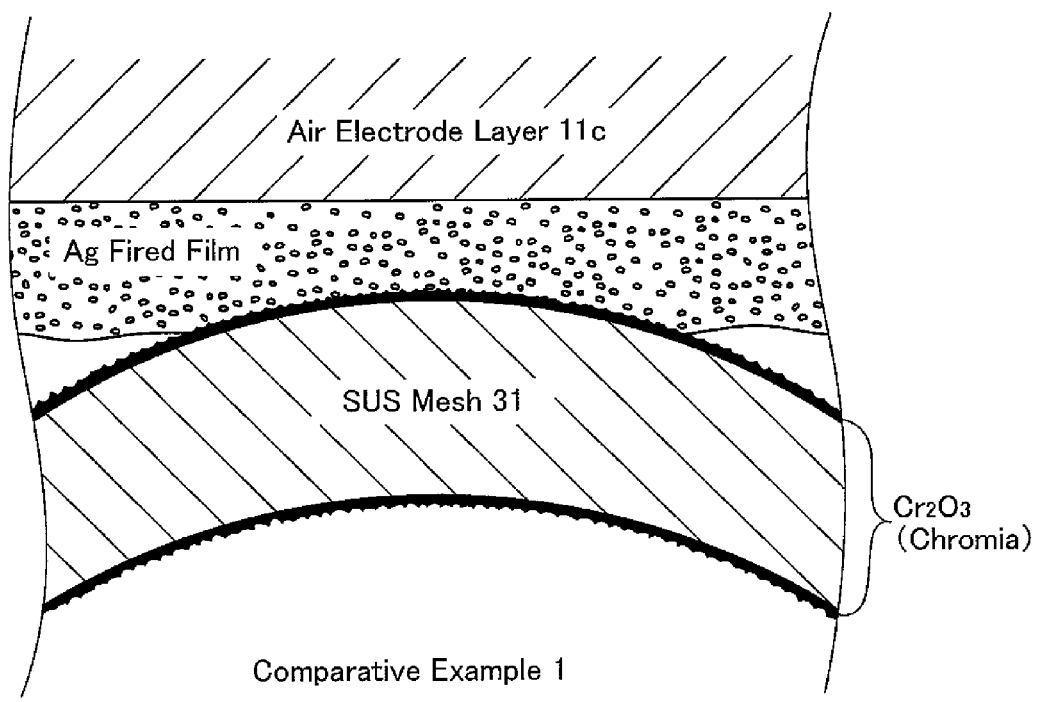
FIG. 17 is a view showing that chromia has been formed on the surface of SUS mesh after heat-treatment in the case shown in FIG. 12.

The results of the first and second experiments will be analyzed below. As shown in FIG. 17, in Comparative Example 1, air (oxygen) can be supplied to the surface of the electrical connection portion with the Ag fired film (accordingly, the air electrode layer 11c) on the SUS mesh 31 (the boundary between the SUS mesh 31 and the Pt fired film) through a large number of pores within the Ag fired film. Therefore, it is believed that, at a high temperature during the manufacturing process of the stack structure, chromia is formed on the surface of the electrical connection portion with the Ag fired film on the SUS mesh 31, and the amount of chromia formed with time after the beginning of the operation is increasing.

Figure 18:
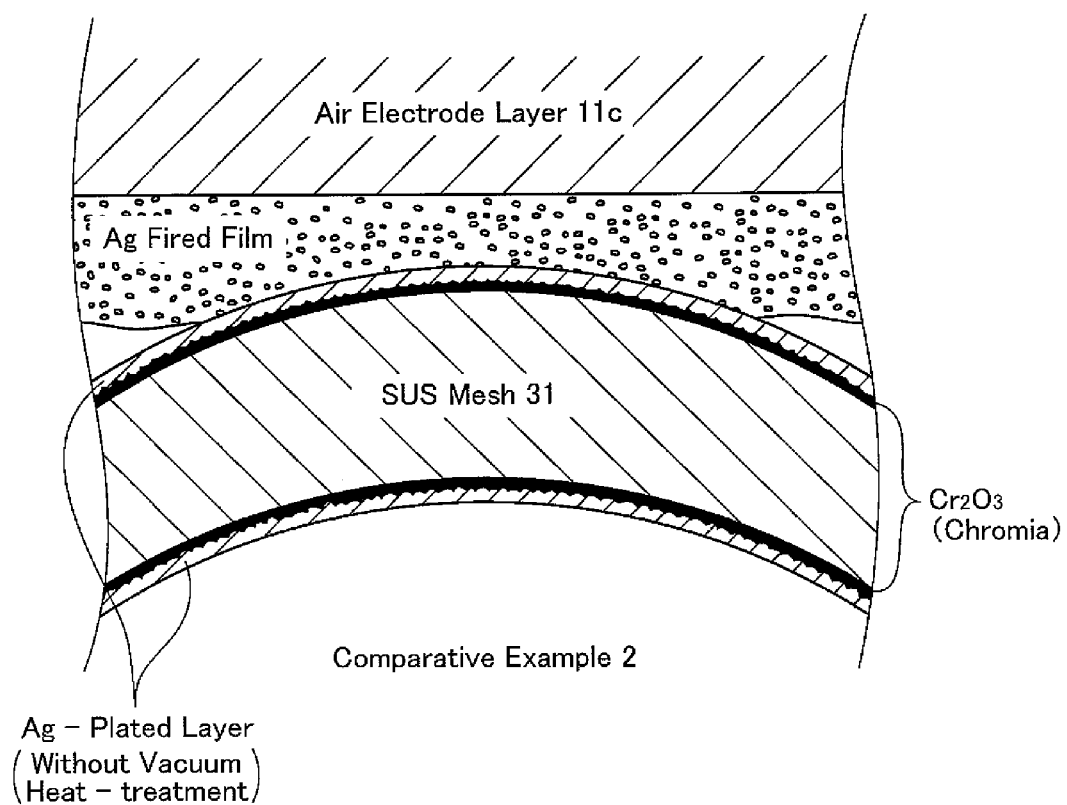
FIG. 18 is a view showing that chromia has been formed on the surface of SUS mesh after heat-treatment in the case shown in FIG. 13.

As shown in FIG. 18, in Comparative Example 2, at a high temperature during the manufacturing process of the stack structure, part of the Ag-plated layer is detached from the surface of the SUS mesh 31 due to the difference of the coefficients of thermal expansion between the SUS mesh 31 and the Ag-plated layer and, through the detached region, oxygen can be supplied to the surface of the SUS mesh 31. Therefore, it is believed that, at a high temperature during the manufacturing process of the stack structure, chromia is formed on the surface of the electrical connection portion with the Ag fired film on the SUS mesh 31 (at the boundary between the SUS mesh 31 and the Ag-plated layer), and the amount of chromia formed with time after the beginning of the operation is increasing.

Figure 16:
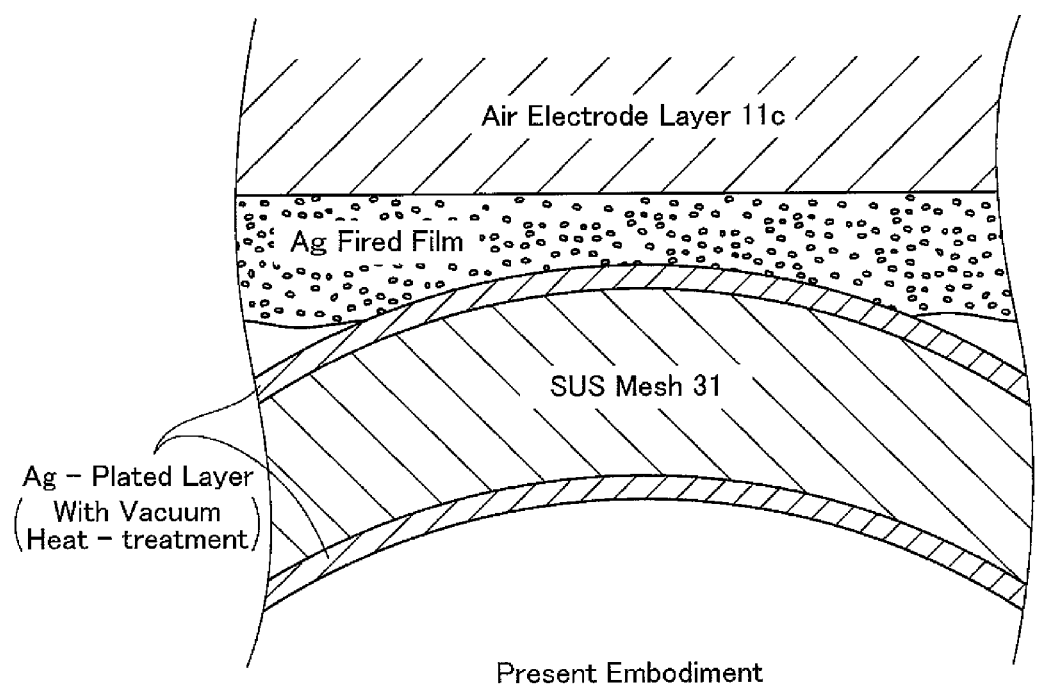
FIG. 16 is a view showing that chromia has not been formed on the surface of SUS mesh after heat-treatment in the case shown in FIG. 11.

To the contrary, as shown in FIG. 16, in the present embodiment, the boundary between the SUS mesh 31 and the metal-plated layer is reacted and integrated by the heat-treatment, and thereby a strong oxygen barrier layer can be formed on the surface of the SUS mesh 31. Therefore, during the subsequent manufacturing process of the stack structure, as well as at a high temperature during the operation, it is believed to be difficult for chromia to be formed on the surface of the electrical connection portion with the Ag fired film (accordingly, the air electrode layer 11c) on the SUS mesh 31.

Figure 19:
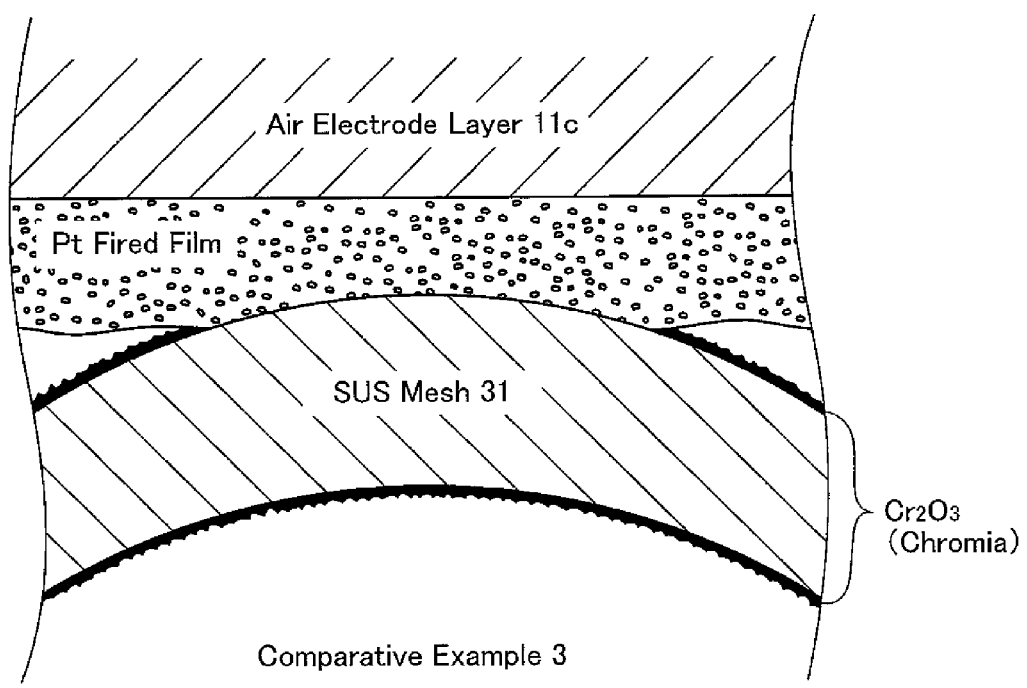
FIG. 19 is a view showing that chromia has been formed on the surface of SUS mesh after heat-treatment in the case shown in FIG. 14.

Further, as shown in FIG. 19, in Comparative Example 3, it is difficult for chromia to be formed only on the surface of the electrical connection portion with the Pt fired film (accordingly, the air electrode layer 11c) on the SUS mesh 31 (at the boundary between the SUS mesh 31 and the Pt fired film). It is believed that this is because the reduction effect of Pt functions on the portion contacting the Pt fired film on the SUS mesh 31. In Comparative Example 3, the electrical resistance of the stack structure is comparable to that in the present embodiment, and therefore the output density comparable to that in the present embodiment is obtained. However, Pt itself is very expensive. In addition, as described above, the output density tends to decrease with time. Consequently, from the view point of the cost-saving of manufacturing as well as the steadiness of the output density, it can be concluded that the present embodiment, wherein Ag with lower cost than Pt is used, is advantageous to Comparative Example 3.

In addition, for a polymer electrolyte fuel cell (PEFC), which is antecedent to a solid oxide fuel cell (SOFC) in the development of fuel cells, very expensive Pt is essential. Accordingly, in order to obtain the superiority over PEFC on the commercialization of SOFC, nonuse of Pt is essential. From such point of view as well, it can be expected that the highly reliable present embodiment wherein Pt is not used and, as described above, high output can be steadily obtained regardless of the structures of a cell and stack, will facilitate the commercialization of SOFC.

Most Suitable Condition for Vacuum Heat-Treatment

Next, the most suitable condition for the vacuum heat-treatment performed after the Ag-plating treatment on the SUS mesh 31 will be described. In accordance with the investigation by the inventors, it was revealed that, in the vacuum heat-treatment, the degree of vacuum (pressure) is preferably from $10^{-5}$ to $10^{-1}$ Pa, the temperature is preferably from 500 to 900° C., and the duration time is preferably from 10 minutes to 3 hrs. A test conducted in order to confirm this will be described below.

In this test, as a test piece, the same SUS bars as those used in the above-described first experiment were used. For each of plural numbers of the test pieces, on which Ag-plated layer had been formed, the vacuum heat-treatment was performed under a different condition. For these plural numbers of test piece, based on the initial resistance values and the observation of the surfaces and the cross-sections thereof (for the existence or nonexistence of chromia) by means of scanning electron microscopy (SEM), the conditions for the vacuum heat-treatment were evaluated. Regarding the Ag-plated layer, from the result of the prior discussion, i.e., "with a thickness of 1 μm or less, the effect as an oxygen barrier layer is low, and with a thickness of 20 μm or more, the possibility of the detachment of the Ag-plated layer is high", it has been revealed that the thickness of the Ag-plated layer is preferably from 1 to 20 μm. Accordingly, in this test, for plural numbers of the test pieces, the thickness of the Ag-plated layer was constant at 10 μm. The results of this test are shown in the table below.

| Condition | Degree of Vacuum [Pa] | Temp. [° C.] | Duration Time [min] | Result | Evaluation |
|---|---|---|---|---|---|
| 1 | 1 | 800 | 60 | Bad | No Barrier Effect (Large Resistance) |
| 2 | $10^{-1}$ | 800 | 60 | Good | Acceptable |
| 3 | $2 \times 10^{-2}$ | 800 | 60 | Good | Acceptable |
| 4 | $1 \times 10^{-3}$ | 800 | 60 | Good | Acceptable |
| 5 | $3 \times 10^{-4}$ | 800 | 60 | Good | Acceptable |
| 6 | $1 \times 10^{-5}$ | 800 | 60 | Good | Acceptable |
| 7 | $1 \times 10^{-3}$ | 450 | 60 | Bad | No Barrier Effect (Large Resistance) |
| 8 | $1 \times 10^{-3}$ | 500 | 60 | Good | Acceptable |
| 9 | $1 \times 10^{-3}$ | 600 | 60 | Good | Acceptable |
| 10 | $1 \times 10^{-3}$ | 700 | 60 | Good | Acceptable |
| 11 | $1 \times 10^{-3}$ | 800 | 60 | Good | Acceptable |
| 12 | $1 \times 10^{-3}$ | 900 | 60 | Good | Acceptable |
| 13 | $1 \times 10^{-3}$ | 950 | 60 | Bad | Failure Due to Deterioration of Ag-plated Layer |
| 14 | $1 \times 10^{-3}$ | 800 | 5 | Bad | No Barrier Effect (Large Resistance) |
| 15 | $1 \times 10^{-3}$ | 800 | 10 | Good | Acceptable |
| 16 | $1 \times 10^{-3}$ | 800 | 30 | Good | Acceptable |
| 17 | $1 \times 10^{-3}$ | 800 | 120 | Good | Acceptable |
| 18 | $1 \times 10^{-3}$ | 800 | 180 | Good | Acceptable |

As can be understood from the above table, at a degree of vacuum (pressure) of higher than $1 \times 10^{-1}$ Pa, there is no effect of oxygen barrier layer, and the initial resistance is very large (refer to Condition 1). On the other hand, at a degree of vacuum in the range of $1 \times 10^{-5}$ to $1 \times 10^{-1}$ Pa, the initial resistance is small, and no formation of chromia can be observed by means of SEM (refer to Conditions 2 to 6). At a temperature of lower than 500° C., there is no effect of oxygen barrier layer, and the initial resistance is very large (refer to Condition 7). At a temperature of higher than 900° C., the deterioration of the Ag-plated layer was observed by means of SEM (refer to Condition 13). On the other hand, at a temperature in the range of 500 to 900° C., the initial resistance is small, and no formation of chromia can be observed by means of SEM (refer to Conditions 8 to 12). With duration time of shorter than 10 minutes, there is no effect of oxygen barrier layer, and the initial resistance is very large (refer to Condition 14). On the other hand, with duration time in the range of 10 minutes to 3 hrs, the initial resistance is small, and no formation of chromia can be observed by means of SEM (refer to Conditions 15 to 18). From the above, in the vacuum heat-treatment, the degree of vacuum is preferably from $10^{-5}$ to $10^{-1}$ Pa, the temperature is preferably from 500 to 900° C., and the duration time is preferably from 10 minutes to 3 hrs.

Thickness of Chromia Layer

The measurement results of the thickness of the "layer containing chromia ($Cr_2O_3$)" (hereinafter, referred to as "chromia layer") formed at the boundary between the SUS mesh 31 and the Ag-plated layer (or Ag fired film) will be described below.

Figure 20:
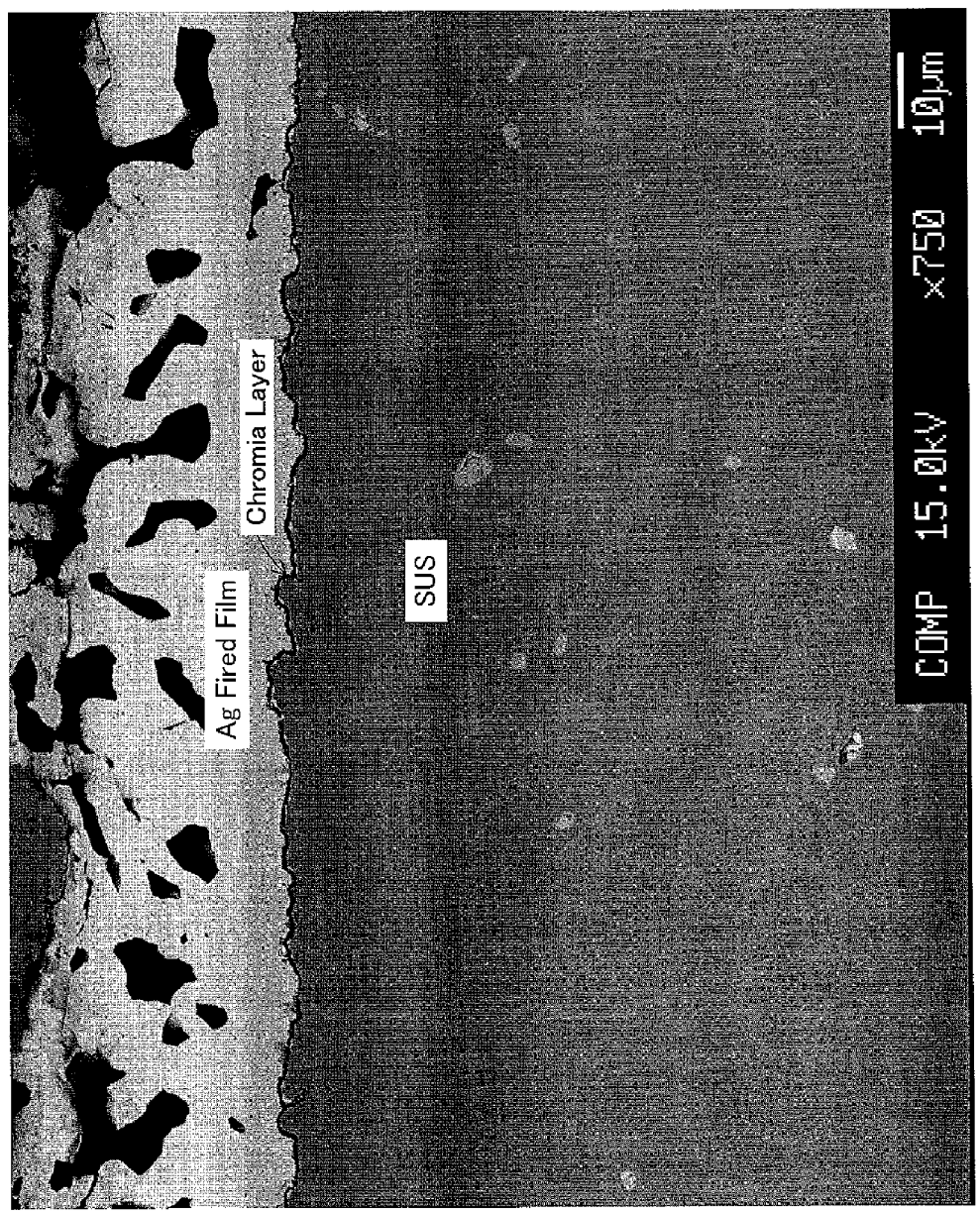
FIG. 20 is a sample of an image obtained by observing a cross-section around the boundary between the SUS mesh and the Ag fired film according to Comparative Example 1 at a magnification of 750 using an Field Emission-Electron Probe Micro-Analysis (FE-EPMA)
Figure 21:
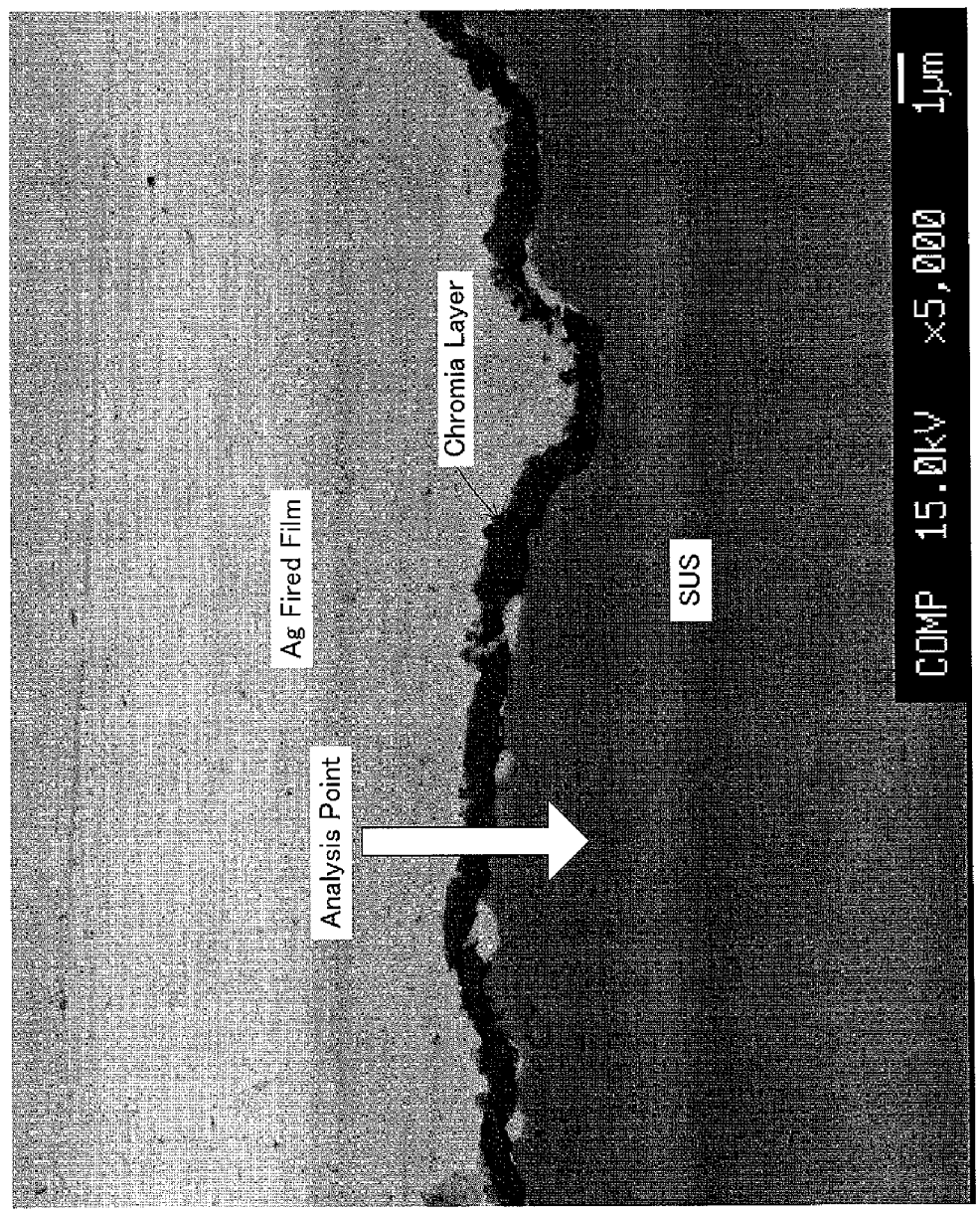
FIG. 21 is a sample of an image obtained by observing a cross-section around the boundary between the SUS mesh and the Ag fired film according to Comparative Example 1 at a magnification of 5000 using an Field Emission-Electron Probe Micro-Analysis (FE-EPMA)
Figure 22:
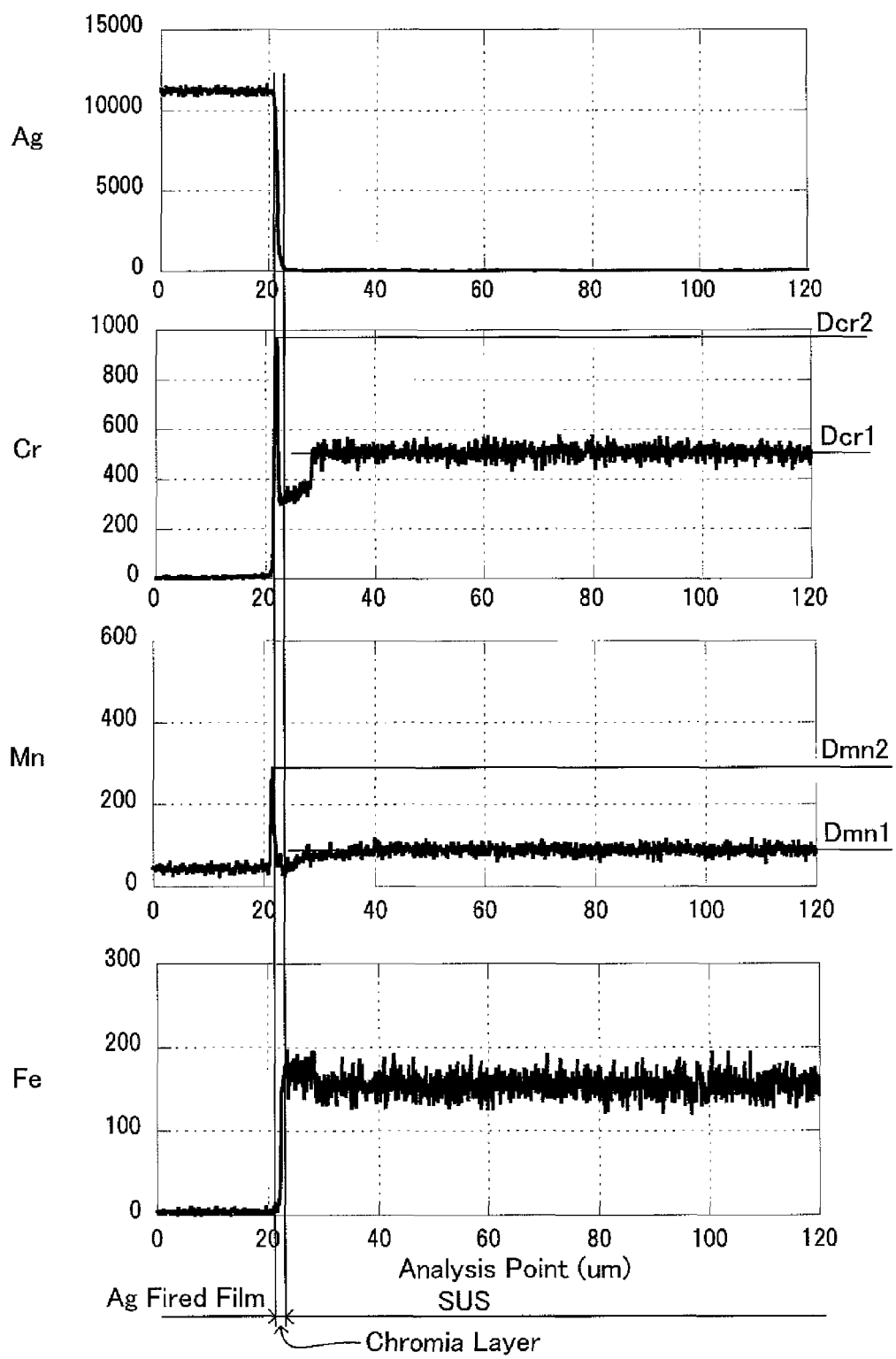
FIG. 22 is a graph showing the result of elementary analysis around the boundary between the SUS mesh and the Ag fired film according to Comparative Example 1.

FIG. 20 and FIG. 21 are samples of images obtained by observing a cross-section around the boundary between the SUS mesh 31 and the Ag fired film according to Comparative Example 1 at magnifications of respectively 750 and 5000 using a Field Emission-Electron Probe Micro-Analysis (FE-EPMA). FIG. 22 is a graph showing the result of elementary analysis around the boundary between the SUS mesh and the Ag fired film according to Comparative Example 1 by scanning the analysis point along the thickness direction from the side of the Ag fired film toward the side of the SUS mesh as indicated by the bold white arrow in FIG. 21. The vertical axis in FIG. 22 represents the diffraction intensity of each element. The diffraction intensity of each element is equivalent to the concentration of each element. These images and analysis results were obtained by means of a field emission electron microprobe analyzer (JXA-8500F) manufactured by JEOL Ltd. As the SUS mesh 31, a ferritic stainless steel for SOFC: ZMG232L (product name) manufactured by Hitachi Metals, Ltd. was used.

As apparent from FIG. 20 to FIG. 22, at the boundary between the SUS mesh 31 and the Ag fired film, a chromia layer has been formed. In addition, as apparent from FIG. 22, the chromia layer is a layer containing chromia as a main component, silver (or silver oxide) and manganese (or manganese oxide).

Plural numbers (N=5) of samples corresponding to Comparative Example 1 were manufactured, and the thickness of a chromia layer was calculated for each of the samples. The thickness of a chromia layer was defined as a "film thickness of the dark gray portion formed around the boundary in the reflection electron image by means of FE-SEM" immediately after the completion of the assembly of SOFC, or under a condition where the total operation period of SOFC is 100 hours or less. According to this definition, the thickness of a chromia layer was from 1.0 to 1.2 μm. The proportion (Dcr2/Dcr1) of the Cr concentration (peak value) in the chromia layer, Dcr2, (refer to FIG. 22) to the Cr concentration (average) in the SUS mesh, Dcr1, (refer to FIG. 22) was from 1.5 to 2.5. The proportion (Dmn2/Dmn1) of the Mn concentration (peak value) in the chromia layer, Dmn2, (refer to FIG. 22) to the Mn concentration (average) in the SUS mesh, Dmn1, (refer to FIG. 22) was from 1.5 to 4.

Figure 23:
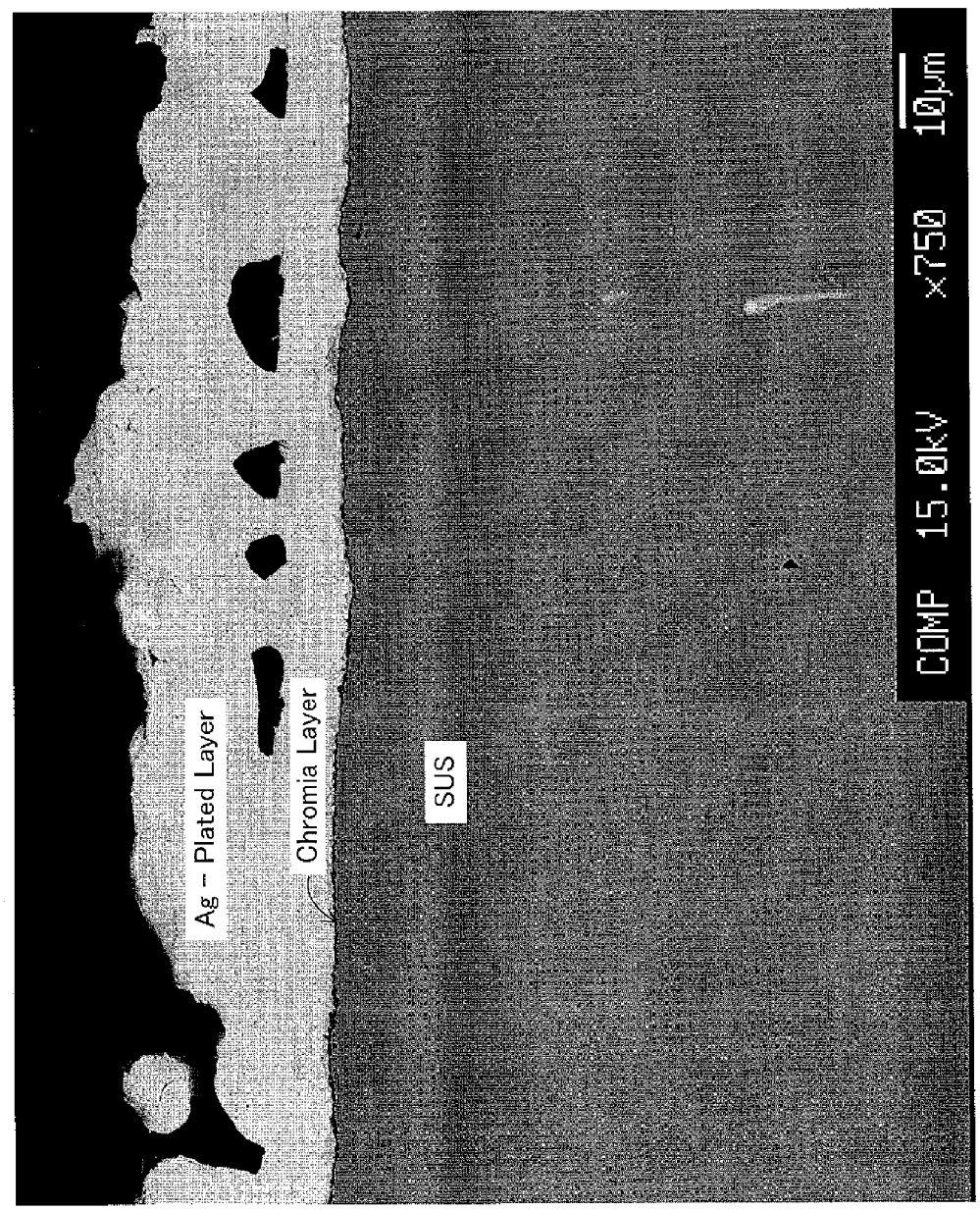
FIG. 23 is a sample of an image obtained by observing a cross-section around the boundary between the SUS mesh and the Ag fired film according to an embodiment of the present invention at a magnification of 750 using an Field Emission-Electron Probe Micro-Analysis (FE-EPMA)
Figure 24:
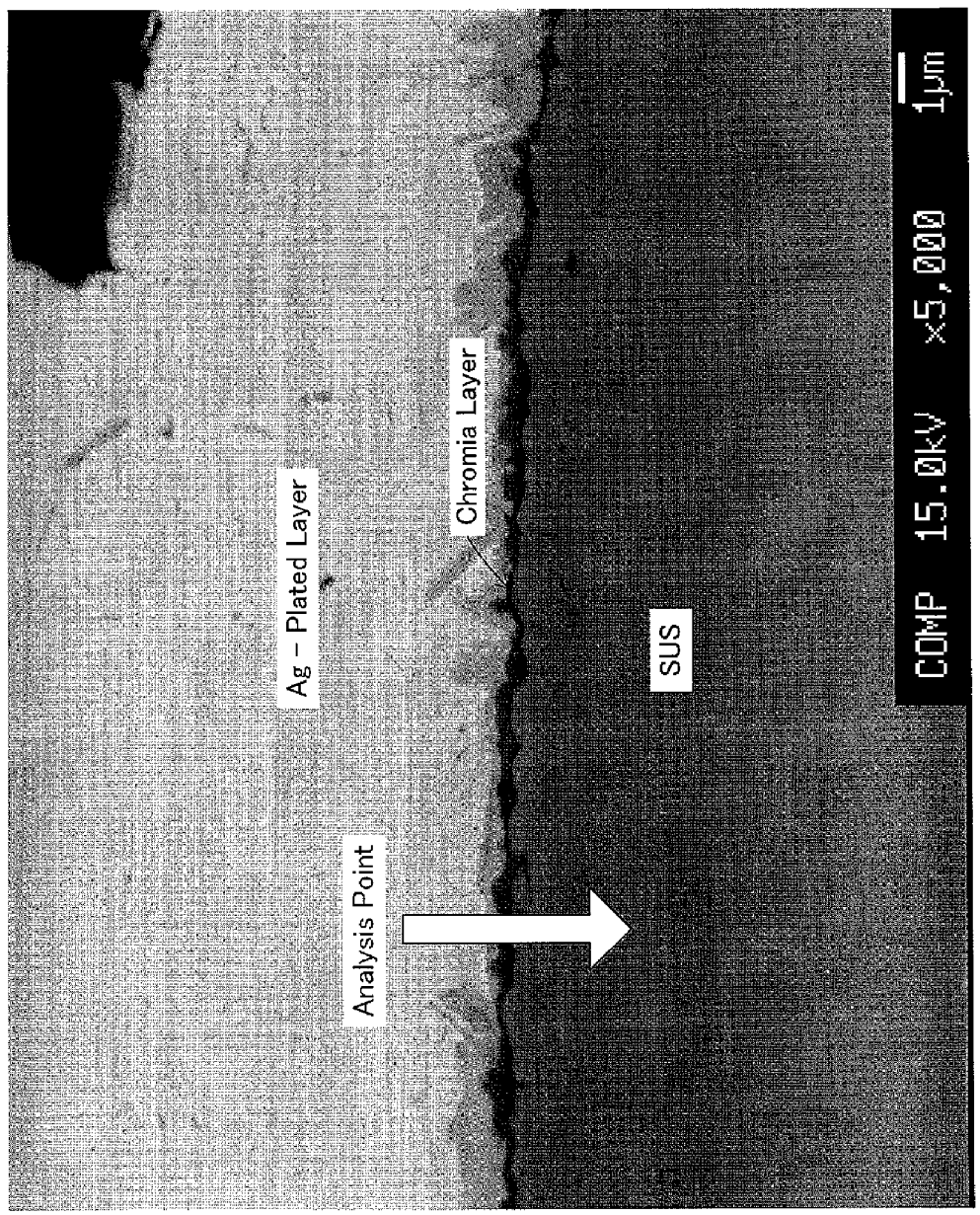
FIG. 24 is a sample of an image obtained by observing a cross-section around the boundary between the SUS mesh and the Ag fired film according to an embodiment of the present invention at a magnification of 5000 using an Field Emission-Electron Probe Micro-Analysis (FE-EPMA)
Figure 25:
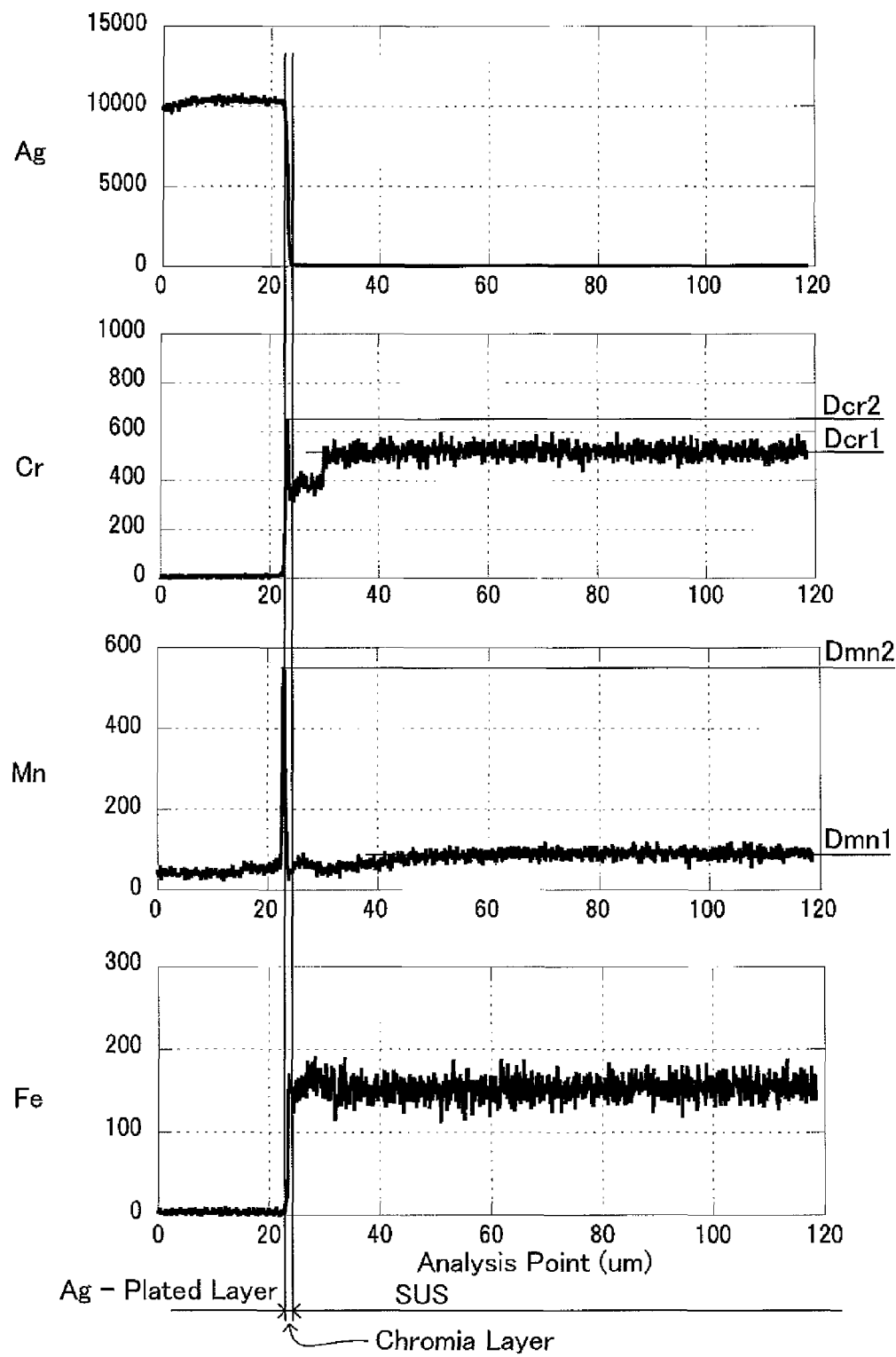
FIG. 25 is a graph showing the result of elementary analysis around the boundary between the SUS mesh and the Ag fired film according to an embodiment of the present invention.

To the contrary, FIG. 23 and FIG. 24 are samples of images obtained by observing a cross-section around the boundary between the SUS mesh 31 and the Ag-plated layer according to the present embodiment at magnifications of respectively 750 and 5000 using a Field Emission-Electron Probe Micro-Analysis (FE-EPMA). FIG. 25 is a graph showing the result of elementary analysis around the boundary between the SUS mesh and the Ag-plated layer according to the present embodiment by scanning the analysis point along the thickness direction from the side of the Ag-plated layer toward the side of the SUS mesh as indicated by the bold white arrow in FIG. 24. FIG. 23 to FIG. 25 correspond to FIG. 20 to FIG. 22, respectively. These images and analysis results were also obtained by means of the same field emission electron microprobe analyzer as described above. Further, a ferritic stainless steel for SOFC: ZMG232L (product name) was used.

As apparent from FIG. 23 to FIG. 25, an extremely thin chromia layer has been formed at the boundary between the SUS mesh 31 and the Ag-plated layer as well. In addition, as apparent from FIG. 25, the chromia layer is a layer containing chromia as a main component, silver (or silver oxide) and manganese (or manganese oxide), too.

Plural numbers (N=5) of samples corresponding to the present embodiment were manufactured, and the thickness of a chromia layer was calculated for each of the samples. The definition of "thickness of a chromia layer" was the same as described above. Among these plural numbers of samples, the condition for the vacuum heat-treatment, i.e., the combination of degree of vacuum (range: $10^{-5}$ to $10^{-1}$ Pa), temperature (range: 500 to 900° C.), and duration time (range: 10 minutes to 3 hrs) was varied respectively. As a result, the thickness of a chromia layer was extremely small, (from under the measuring limit of SEM to) less than 0.8 μm. The lower limit of the thickness of a chromia layer was less than the measuring limit of SEM. The measuring limit of SEM was 0.01 μm. The proportion (Dcr2/Dcr1) of the Cr concentration (peak value) in the chromia layer, Dcr2, (refer to FIG. 25) to the Cr concentration (average) in the SUS mesh, Dcr1, (refer to FIG. 25) was from 0.3 to 1.5. The proportion (Dmn2/Dmn1) of the Mn concentration (peak value) in the chromia layer, Dmn2, (refer to FIG. 25) to the Mn concentration (average) in the SUS mesh, Dmn1, (refer to FIG. 25) was from 4 to 8.

As can be understood from the above results, in the present embodiment, as compared with Comparative Example 1, the thickness of the chromia layer formed at the boundary between the SUS mesh 31 (the "conductive member") and the Ag-plated layer (or Ag fired film) (the "metal film") is extremely thin. It is believed that this greatly contributes to the fact that the electrical resistance (internal resistance) of the electrical connection portion between the SUS mesh 31 and the air electrode layer 11*c* in the present embodiment is sufficiently small as compared with that in Comparative Example 1.

As described above, the solid oxide fuel cell according to the embodiment of the present invention has the stack structure formed by stacking the sheet bodies 11, each of which comprises three layers of the electrolyte layer 11*a*, the fuel electrode layer 11*b*, and the air electrode layer 11*c*, and the separators 12 in alternating layers. In the air channel 21 defined between the air electrode 11*c* and the separator 12 facing the air electrode layer 11*c*, the SUS mesh 31 made of stainless steel for electrically connecting both of them is confined. On the surface of the SUS mesh 31, previously by itself before the assembly of the stack structure, the Ag-plating treatment is performed and further the vacuum heat-treatment is performed. Thereby, at a high temperature during the assembly process of the stack structure, and during the operation of the fuel cell, on the surface of the electrical connection portion with the air electrode layer 11*c* on the SUS mesh 31, chromia ($Cr_2O_3$), which is the oxide of stainless steel and has a high electrical resistance, is not formed. Accordingly, the increase in the electrical resistance (internal resistance) of the fuel cell as a whole due to the formation of chromia can be suppressed, and consequently the decrease in the output of the fuel cell as a whole can be suppressed.

The present invention is not limited to the above-described embodiment, but can be modified in various other forms without departing from the scope of the present invention. For example, although the SUS mesh 31 and the air electrode layer 11c are electrically connected through the Ag fired film in the above-described embodiment, the SUS mesh 31 and the air electrode layer 11c may directly contact to be electrically connected without the interposition of the Ag fired film.

Although Ag paste is adopted as an adhesive paste interposing between the SUS mesh 31 and the air electrode layer 11c in the above-described embodiment, electrically conductive ceramic paste may be used. Although an Ag-plating treatment is adopted as a metalizing plating treatment performed on the surface of the SUS mesh 31 in the above-described embodiment, a Zn-plating treatment may be adopted.

Although a metal mesh (SUS mesh) is adopted as a "conductive member" for electrically connecting the air electrode layer 11c and the lower separator 121 in the above-described embodiment, it may be one or plural rod-like electrically conductive bodies connecting the air electrode layer 11c and the lower separator 121.

In the above-described embodiment, the fuel electrode layer 11b can be formed from, for example, platinum, platinum-zirconia cermet, platinum-cerium oxide cermet, ruthenium, ruthenium-zirconia cermet or the like.

Also, the air electrode layer 11c can be formed from, for example, lanthanum-containing perovskite-type complex oxide (e.g., lanthanum cobaltite, in addition to the above-mentioned lanthanum manganite). Lanthanum cobaltite and lanthanum manganite may be doped with strontium, calcium, chromium, cobalt (in the case of the lanthanum manganite), iron, nickel, aluminum, or the like. Also, the air electrode layer 11c may be formed from palladium, platinum, ruthenium, platinum-zirconia cermet, palladium-zirconia cermet, ruthenium-zirconia cermet, platinum-cerium oxide cermet, palladium-cerium oxide cermet, or ruthenium-cerium oxide cermet.

In the above-mentioned embodiment, the sheet body 11 and the separator 12 have a planar shape of square. However, the sheet body 11 and the separator 12 may have a planar shape of rectangle, circle, ellipse, etc.

Figure 26:
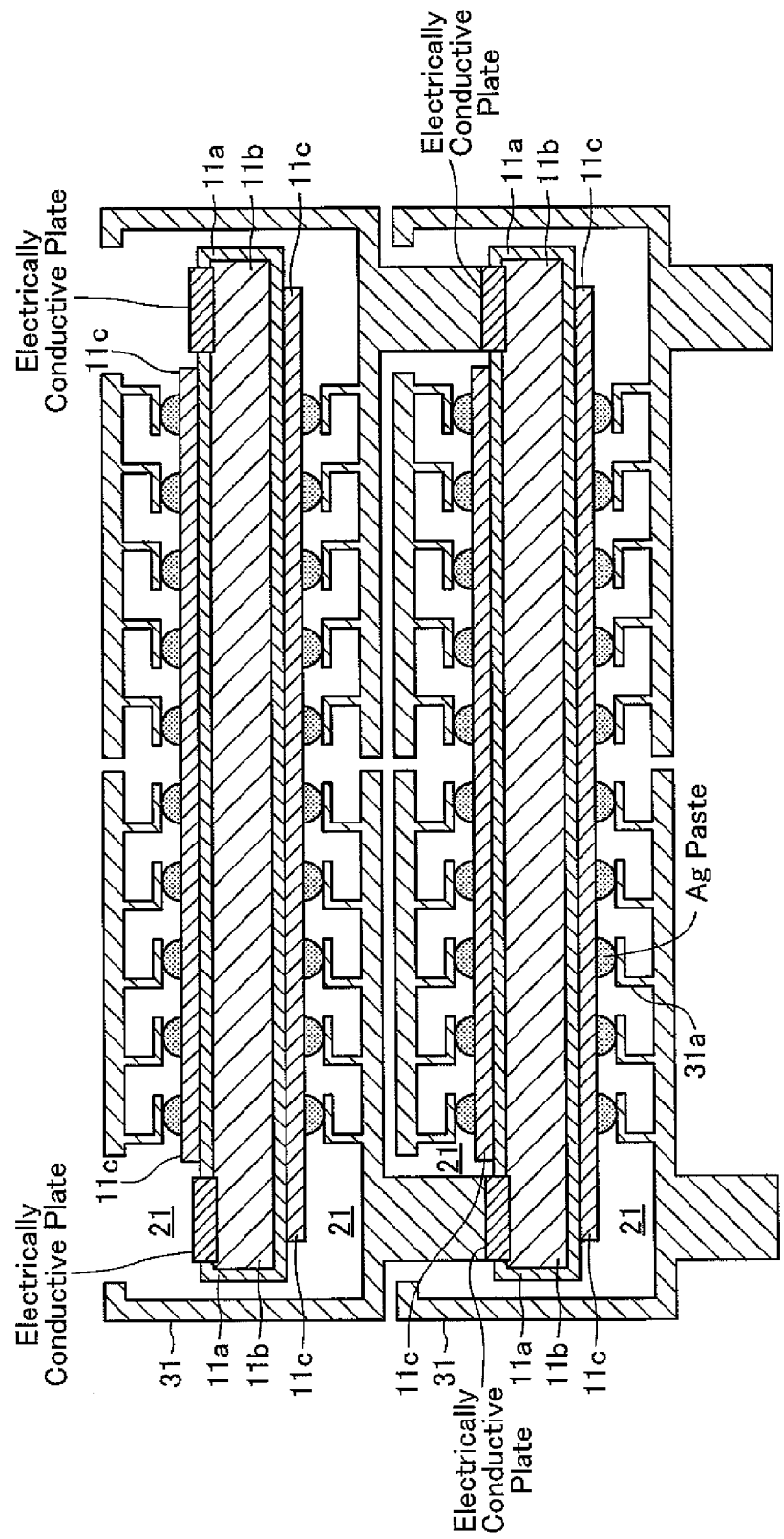
FIG. 26 is a schematic sectional view of a solid oxide fuel cell according to a modified example of an embodiment of the present invention.

In addition, in the above-described embodiment, the sheet body 11 comprising a solid electrolyte layer 11a and a fuel electrode layer 11b and an air electrode layer 11c is used as a "reaction member", and the stack structure, wherein a metal mesh (SUS mesh 31) is used as an "electrically conductive member", is adopted (refer to FIG. 10). However, the stack structure shown in FIG. 26 may be adopted. In FIG. 26, for the members that are the same as or comparable to those shown in a previously referred figure, the same reference letters as those in a previously referred figure.

In the stack structure shown in FIG. 26, as a "reaction member", a thin sheet body, wherein the electrolyte portion 11a is respectively formed on the upper and lower surfaces of the flat sheet-like fuel electrode portion 11b, and the air electrode portion 11c is respectively formed on the upper surface of the upper electrolyte portion 11a and the lower surface of the lower surface of the lower electrolyte portion 11a, is used. Also, as a "electrically conductive member", a flat sheet-like member 31 made of stainless steel and having plural numbers of salient 31a projecting toward the air electrode portion 11c is used. The flat sheet-like member 31 and the air electrode portion 11c are connected through an Ag paste as an "adhesive paste." Similarly to the above-described embodiment, on the surface of the flat sheet-like member 31, previously by itself before the assembly of the stack structure, the Ag-plating treatment is performed and further the vacuum heat-treatment is performed.

What is claimed is:

1. A solid oxide fuel cell reactor which comprises:
    a reaction member comprising an electrolyte portion containing a solid oxide electrolyte, a fuel electrode portion arranged integrally with said electrolyte portion and contacting a fuel gas to react said fuel gas, and an air electrode portion arranged integrally with said electrolyte portion and contacting an oxygen-containing gas to react said oxygen-containing gas;
    other than said reaction member, an electrically conductive member made of metal containing iron and chromium, electrically connected with said air electrode portion to give and receive electrical power to and from said air electrode portion, wherein said air electrode portion and said electrically conductive member are physically fixed and electrically connected through a structure consisting of an electrically conductive adhesive metal fired film, an oxygen barrier metal layer and a layer containing $Cr_2O_3$ formed at the boundary between said electrically conductive member and said oxygen barrier metal layer; and
    the thickness of said layer containing $Cr_2O_3$ is 0.8 μm or less.

2. The reactor according to claim 1, wherein said electrically conductive member is made of stainless steel, and said metal fired film is made of Ag.

3. The reactor according to claim 2, wherein the proportion of the chromium concentration in said layer containing $Cr_2O_3$ to the chromium concentration in said electrically conductive member is from 0.3 to 1.5.

4. The reactor according to claim 1, wherein portions of the electrically conductive member are spaced away from the air electrode portion of the reaction member.

5. The reactor according to claim 1, wherein the electrolyte portion is formed of a solid ceramic electrolyte.

6. The reactor according to claim 1, wherein the electrolyte portion has opposed surfaces, and the fuel electrode and the air electrode portions are in direct contiguous contact with the surfaces of the electrolyte portion, respectively.

* * * * *